US012784054B2

(12) United States Patent
Venkatapathy et al.

(10) Patent No.: US 12,784,054 B2
(45) Date of Patent: Nov. 3, 2026

(54) PREPROCESSING CRYPTOCURRENCY TRANSACTIONS

(71) Applicant: MASTERCARD INTERNATIONAL INCORPORATED, Purchase, NY (US)

(72) Inventors: Ragunath Venkatapathy, O'Fallon, MO (US); Ramya Kumarasamy, O'Fallon, MO (US); Ravi Siva Prasad Malipeddi, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/955,933

(22) Filed: Nov. 21, 2024

(65) Prior Publication Data

US 2026/0141393 A1 May 21, 2026

(51) Int. Cl.
*G06Q 20/40* (2012.01)
*G06Q 20/02* (2012.01)
*G06Q 20/06* (2012.01)

(52) U.S. Cl.
CPC ......... *G06Q 20/4016* (2013.01); *G06Q 20/02* (2013.01); *G06Q 20/0655* (2013.01)

(58) Field of Classification Search
CPC . G06Q 20/4016; G06Q 20/02; G06Q 20/0655
See application file for complete search history.

(56) References Cited

U.S. PATENT DOCUMENTS 11,375,009 B1 6/2022 Zhang et al.
11,676,135 B2 6/2023 Bhamidipati et al.
11,695,755 B2 7/2023 Caldera et al.
11,797,995 B2 10/2023 Arora et al.
11,809,896 B2 11/2023 Baset et al.
11,830,004 B2 11/2023 Kuchar et al.
11,886,557 B1 1/2024 Thanh Tran
2015/0363782 A1 12/2015 Ronca et al.

(Continued)

OTHER PUBLICATIONS

Dan Freeman, et al. "Enhancing Trust in the Cryptocurrency Marketplace: A reputation Scoring Approach," 2018, 35 pages.

(Continued)

*Primary Examiner* — Patrick Mcatee
*Assistant Examiner* — Vincent I Idiake
(74) *Attorney, Agent, or Firm* — Barta Jones, PLLC

(57) ABSTRACT

Examples predict changes in risk scores in cryptocurrency transactions between potential transacting parties. The system identifies a tentative transaction between the sender and receiver on a cryptocurrency blockchain. The system builds a receiver transaction tree based on cryptocurrency transactions already recorded in the blockchain. The system also similarly builds a sender transaction tree. The system calculates a current risk score of the sender party based on the second transaction tree. The system builds a third transaction tree by adding the first transaction tree into the second transaction tree, thereby simulating the sender party as having transacted with the receiver party. The system then calculates a predicted risk score of the sender party based on the third transaction tree and transmits one or more of the predicted risk score and a change in risk score to the sender party.

20 Claims, 11 Drawing Sheets

(56) References Cited

U.S. PATENT DOCUMENTS

| | | | | |
|---|---|---|---|---|
| 2017/0083959 | A1* | 3/2017 | Bousis | G06Q 30/0643 |
| 2019/0172067 | A1* | 6/2019 | Arora | G06Q 20/4016 |
| 2020/0160344 | A1* | 5/2020 | Jevans | G06Q 20/065 |
| 2021/0097546 | A1* | 4/2021 | Adjaoute | G06Q 30/0201 |
| 2021/0383395 | A1* | 12/2021 | Galka | G06Q 20/065 |
| 2022/0083683 | A1* | 3/2022 | Murck | G06Q 20/3825 |
| 2022/0101326 | A1 | 3/2022 | Kim et al. | |
| 2023/0283616 | A1 | 9/2023 | Mckinnon et al. | |
| 2023/0419326 | A1 | 12/2023 | Xie et al. | |
| 2025/0117797 | A1* | 4/2025 | Ruan | G06N 5/045 |
| 2025/0217810 | A1* | 7/2025 | Kupiszowski | G06Q 20/407 |

OTHER PUBLICATIONS

Lee, Kang Ha, “International Search Report & Written Opinion”, International Application No. PCT/US2025/050008, mailed on Feb. 2, 2026 (9 pp.).

* cited by examiner

PREPROCESSING CRYPTOCURRENCY TRANSACTIONS

BACKGROUND

In fiat transactions, the identities and reputations of the parties to any given transaction are typically known to each other, or may otherwise be investigated. However, in cryptocurrency blockchain systems, identities and reputations of the parties may be uncertain. Transacting with risky senders and receivers in cryptocurrency blockchain systems can lead to significant complications, such as increased scrutiny from financial institutions and regulatory bodies, restrictions, closures, and legal repercussions such as fines or imprisonment (e.g., if linked to illegal activities like money laundering or terrorism financing). Further, such associations can lead to reputational damage, loss of trust, and financial setbacks such as frozen assets and increased compliance costs.

SUMMARY

Some examples provide a cryptocurrency preprocessing system that includes at least one processor; and at least one memory comprising computer-readable instructions, the at least one processor, the at least one memory and the computer-readable instructions configured to cause the at least one processor to: identify a tentative transaction between a first party and a second party on a cryptocurrency blockchain, the tentative transaction being a cryptocurrency transaction under consideration by the second party prior to submitting the tentative transaction to the cryptocurrency blockchain; construct a first transaction tree for the first party based on first cryptocurrency transactions already recorded in the cryptocurrency blockchain that directly involve the first party, the first party being represented by a first root node in the first transaction tree, one or more child nodes being attached to the first root node and representing one or more other parties to the first cryptocurrency transactions with which the first party has transacted; construct a second transaction tree for the second party based on second cryptocurrency transactions already recorded in the cryptocurrency blockchain that directly involves the second party, the second party being represented by a second root node in the second transaction tree, one or more other child nodes being attached to the second root node and representing one or more other parties to the second cryptocurrency transactions with which the second party has transacted; calculate a current risk score of the second party based on the second transaction tree; modify the second transaction tree by adding the first transaction tree to the second transaction tree, the first root node being directly connected as a child node to the second root node, thereby simulating the first party as having transacted with the second party; calculate a predicted risk score of the second party based on the modified second transaction tree; and cause one or more of the predicted risk score and a change in risk score to be displayed to the second party.

Other examples provide a computer-implemented method for predicting changes in risk scores in cryptocurrency transactions. The method includes: identifying a tentative transaction between a sender party and a receiver party on a cryptocurrency blockchain, the tentative transaction being a cryptocurrency transaction under consideration by the sender party prior to submitting the tentative transaction to the cryptocurrency blockchain; building a first transaction tree for the receiver party based on first cryptocurrency transactions already recorded in the cryptocurrency blockchain that directly involve the receiver party, the receiver party being represented by a first root node in the first transaction tree, one or more child nodes being attached to the first root node and representing one or more other parties to the first cryptocurrency transactions with which the receiver party has transacted; building a second transaction tree for the sender party based on second cryptocurrency transactions already recorded in the cryptocurrency blockchain that directly involves the sender party, the sender party being represented by a second root node in the second transaction tree, one or more other child nodes being attached to the second root node and representing one or more other parties to the second cryptocurrency transactions with which the sender party has transacted; calculating a current risk score of the sender party based on the second transaction tree; building a third transaction tree, the third transaction tree including adding the first transaction tree into the second transaction tree, the first root node being directly connected as a child node to the second root node, thereby simulating the sender party as having transacted with the receiver party; calculating a predicted risk score of the sender party based on the third transaction tree; and transmitting one or more of the predicted risk score and a change in risk score to the sender party.

Still other examples provide a computer storage medium. The computer storage medium has computer-executable instructions that, upon execution by a processor of a computer, cause the processor to at least: identify a tentative transaction between a first party and a second party on a cryptocurrency blockchain, the tentative transaction being a cryptocurrency transaction under consideration by the second party prior to submitting the tentative transaction to the cryptocurrency blockchain; construct a first transaction tree for the first party based on first cryptocurrency transactions already recorded in the cryptocurrency blockchain that directly involve the first party, the first party being represented by a first root node in the first transaction tree, one or more child nodes being attached to the first root node and representing one or more other parties to the first cryptocurrency transactions with which the first party has transacted; construct a second transaction tree for the second party based on second cryptocurrency transactions already recorded in the cryptocurrency blockchain that directly involves the second party, the second party being represented by a second root node in the second transaction tree, one or more other child nodes being attached to the second root node and representing one or more other parties to the second cryptocurrency transactions with which the second party has transacted; calculate a current risk score of the second party based on the second transaction tree; modify the second transaction tree by adding the first transaction tree to the second transaction tree, the first root node being directly connected as a child node to the second root node, thereby simulating the first party as having transacted with the second party; calculate a predicted risk score of the second party based on the modified second transaction tree; and cause one or more of the predicted risk score and a change in risk score to be displayed to the second party.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
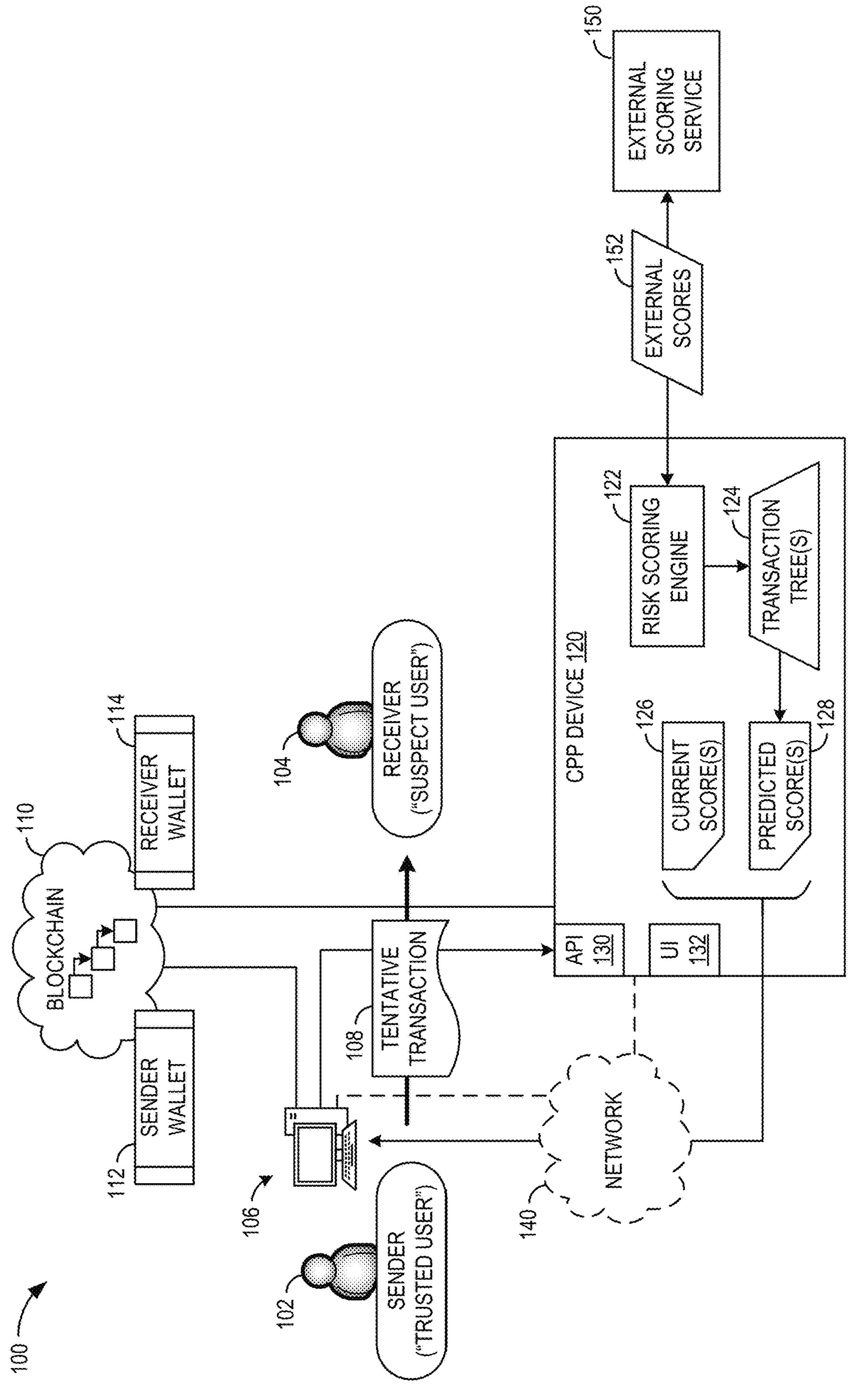
FIG. 1 is a block diagram illustrating an example cryptocurrency preprocessing (CPP) system for evaluating the potential effects that cryptocurrency transactions may have on the parties.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

Some technical solutions have been developed to combat fraud and improve the integrity of transactions in cryptocurrency blockchain systems. For example, some blockchain analytics and compliance services assign risk scores to blockchain accounts (e.g., blockchain addresses, wallets, or the like) and transactions based on various factors, such as transaction history and connections to known illicit activities. Other example services include identity verification (e.g., verifying the identities of users to ensure they are legitimate and comply with regulatory requirements), regulatory reporting (e.g., providing automated tools to generate and submit reports required by regulatory bodies), and transaction monitoring and pattern recognition (e.g., continuously analyzing blockchain transactions to detect unusual or suspicious activities, recognize patterns that might indicate fraudulent behavior or money laundering).

However, while risk scoring of blockchain accounts may provide some insight into particular accounts, such scoring does not offer a clear picture into the reputational impact that may occur if a first user with a particular score transacts with a second user having a lower score. For example, the first user may unknowingly transact with an illicit account (e.g., an account associated with illegal activities), which may lead to negative impacts for the first user, such as reputational damage, frozen accounts or assets, legal consequences, or the like.

Referring to the figures, examples of the disclosure allow cryptocurrency users to evaluate "tentative transactions" with a particular "suspect wallet" prior to performing that transaction. More specifically, a cryptocurrency preprocessing (CPP) system evaluates how the reputation of a "trusted user" may change if a particular transaction (the tentative transaction) is performed with the suspect wallet.

For example, the trusted user (the "sender") is considering sending an amount of cryptocurrency (referred to herein as "coin" or "token," e.g., Bitcoin (BTC), Ethereum (ETH), stablecoin, or the like) to a particular suspect user (the "receiver"). The trusted user maintains an account ("trusted wallet") on the cryptocurrency blockchain, and the trusted user has been careful to protect the integrity of that wallet (e.g., by transacting only with known wallets). As such, prior to performing this tentative transaction, a risk evaluation of that trusted wallet and the various transactions that have been performed using that wallet yield a high trustworthiness (e.g., a low risk score).

Accordingly, to protect the integrity of this wallet, the trusted user submits the tentative transaction to the CPP system prior to executing the transaction on the cryptocurrency blockchain. In examples, the CPP system generates a current score for the trusted account (e.g., being evaluated without the tentative transaction), as well as a predicted score for the trusted account if that tentative transaction were to be performed. Since this predicted score incorporates the tentative transaction being performed with the suspect account, the predicted score may be negatively impacted if the suspect account is somehow irreputable. These scores are presented to the trusted user, thereby allowing the trusted user to evaluate the potential impact of the tentative transaction prior to executing that transaction with the suspect party.

To evaluate the potential impact of the tentative transaction, in examples, the CPP system generates a transaction tree for the suspect wallet. This "suspect wallet transaction tree" uses the transactions recorded in the blockchain to build a tree of wallets with which the suspect wallet has transacted. More specifically, this transaction tree starts with the suspect wallet as the root node. The CPP system analyzes the blockchain to identify all the wallets with which the suspect wallet has transacted (the first layer wallets, or "direct wallets"). Each of these direct wallets is attached to the root node in the transaction tree. For each direct wallet, the CPP system then identifies all the wallets with which that direct wallet has transacted (the second layer wallets, or "secondary wallets"), attaching those secondary wallets to the direct wallet in the transaction tree. As such, the transaction tree is constructed several layers deep, effectively identifying a network of wallets with which the suspect wallet has some direct or distant relation.

For each of the wallets in the transaction tree, the CPP system generates or retrieves a risk score. In examples, the CPP system utilizes an external risk scoring service that provides a composite risk score for the given wallet, as well as one or more tailored risk scores (e.g., fraud risk, lending risk, reputation risk). As such, each of the nodes in the transaction tree are populated with associated risk scores ("external risk scores"). These external risk scores are used by the CPP system to evaluate the reputation of the various wallets in the transaction tree, allowing the CPP system to evaluate how reputable that wallet appears to be.

Likewise, the CPP system also constructs a transaction tree for the trusted wallet (a "trusted wallet transaction tree"). Similar to the suspect wallet transaction tree, the CPP system also retrieves external scores for each of the direct wallets and more distant wallets with which the trusted wallet has transacted (e.g., out to some depth).

To evaluate the potential change in reputation that may occur to the trusted wallet if the tentative transaction were to occur, the CPP system uses an internal scoring engine to evaluate how the score of the trusted wallet changes when the tentative transaction is applied. More specifically, the CPP system uses the internal scoring engine to generate several "internal scores" for the trusted wallet. First, the scoring engine evaluates the trusted wallet transaction tree to generate a current score for the trusted wallet. This current score represents a score of the trusted wallet without the tentative transaction being applied (e.g., the reputation of the trusted wallet prior to transacting with the suspect wallet).

Next, the scoring engine modifies the trusted wallet transaction tree by applying the tentative transaction. More specifically, the CPP system adds the suspect wallet transaction tree onto the trusted wallet transaction tree. The suspect wallet thus becomes a new node directly attached to the trusted wallet (e.g., as if the trusted wallet and suspect wallet had performed this tentative transaction), and all the other wallets related to the suspect wallet are likewise added to the suspect wallet (e.g., as they appear in the suspect wallet transaction tree). As such, this modification to the trusted wallet transaction tree effectively modifies the trusted wallet transaction tree as if the tentative transaction had been performed. Using this modified transaction tree for the trusted wallet, the scoring engine then generates a predicted score for the trusted wallet.

In some examples, the internal scoring engine applies filters to any of the transaction trees. These filters may eliminate or otherwise exclude certain nodes from being used during internal scoring. For example, the scoring engine may be configured to include only transactions occurring within a predefined period of time (e.g., within the last 6 months), or within a predefined degree of separation (e.g., only direct or secondary relations), or only transactions above a predefined threshold value. In some examples, the internal scoring engine applies weights to nodes in the transaction trees. These weights change the significance of each particular node within the internal scoring. For example, transactions that occurred more recently may be weighted higher than more stale transactions, or wallets that are further removed may be weighted lower than closer wallets, or transactions with higher values may be weighted higher than transactions with lower values.

Accordingly, the CPP system generates both a "before" and "after" score for the trusted wallet. These current and predicted scores are presented to the trusted user prior to performing the tentative transaction, thereby allowing the user to evaluate how the reputation on their account may change. In situations where the suspect account is somehow directly or indirectly linked to illicit activities, the predicted score may be lower than the current score, thereby indicating potential negative impact to the trusted account. As such, the CPP system allows the user to evaluate potential negative impacts as well as the magnitude of potential negative impact in interacting with the suspect wallet before transacting.

The conventional computing device operates in an unconventional manner by predicting risk scores of a sender if they were to perform a tentative transaction with a receiver on a cryptocurrency blockchain. The system builds transaction trees of both the sender and the receiver based on blockchain transactions already recorded in the blockchain. The system generates a current score for the sender based on the sender's transaction tree, then adds in the transaction tree of the receiver into the sender's transaction tree, thereby simulating the execution of the tentative transaction with the receiver. The system then calculates a predicted risk score from the modified sender transaction tree. This analytics allows the sender to view their current score (without having transacted with the receiver) and the predicted score (as if they have transacted with the receiver), thereby allowing the sender to anticipate whether their own risk score may go down if they transact with this particular sender. Such a technical solution allows the users to avoid performing blockchain operations that may negatively impact their presence on the blockchain, thus improving the usability and security of transacting on the blockchain. For example, the sender's wallet may be secured from blocking by not performing the tentative transaction if the tentative transaction is predicted to severely impact the risk score of the sender's wallet. Further, by not performing risky transactions, the processing load of actually processing the risky transactions is reduced, thereby reducing both network traffic and all of the additional processing that occurs with additional transactions with risky parties.

FIG. 1 is a block diagram illustrating an example cryptocurrency preprocessing (CPP) system 100 for evaluating the potential effects that cryptocurrency transactions may have on the parties. In the example, a sender (or "trusted user") 102 is contemplating performing a tentative transaction 108 with a receiver (or "suspect user") 104 on a cryptocurrency system (e.g., blockchain 110). Prior to executing the tentative transaction 108 on the blockchain 110, the tentative transaction 108 is transmitted to the CPP system 100 for analysis. The CPP system 100 includes a CPP device 120 that is configured to analyze the tentative transaction 108, particularly to give the sender 102 a sense of how their reputation may be impacted if they were to transact with the receiver 104. This insight allows the sender 102 to consider whether or not they want to perform the tentative transaction 108 with the target receiver 104 prior to execution, thus allowing the sender 102 to potentially avoid negative impacts.

More specifically, the blockchain 110 is a blockchain-based cryptocurrency system that establishes a non-fiat based currency (also referred to as the "cryptocurrency," typically denominated in "coins" or "tokens") that allows participants to exchange the cryptocurrency via transactions recorded into the blockchain 110 (e.g., via a distributed ledger technology). Each of the participants in the blockchain 110 establishes an account on the blockchain 110 (e.g., an address, a wallet, or the like). While a cryptocurrency wallet and an address on the blockchain 110 are interconnected but distinct elements, for ease of discussion, the term "wallet" is used herein to refer to a unique account or address within the blockchain 110 of the cryptocurrency system (e.g., as a unique account that can store value, be accessed by its owner, perform transactions with other addresses on the blockchain 110, and so forth). The blockchain 110 provides various features for the wallets, such as establishing security for the participant/owner of the wallet (e.g., via public/private keys for authentication), allowing value to be assigned to particular wallets (and thus owned, controlled, allocated to that participant), and other known functions.

In this example, the sender 102 has a sender wallet 112 on the blockchain 110, and the receiver 104 has a receiver wallet 114 on the blockchain 110. Further, it is presumed that the sender 102 is contemplating sending an amount of cryptocurrency to the receiver 104, and that the tentative transaction 108 includes details representing that contemplated transfer. As such, in examples, the tentative transaction 108 identifies an amount of cryptocurrency to be transferred (the "transaction amount", e.g., a number of coins, tokens, or the like), the sender wallet 112 as the source of the transaction (e.g., an address associated with the sender wallet 112), and the receiver wallet 114 as the target of the transaction (e.g., an address associated with the receiver wallet 114).

In this example, the tentative transaction 108 and its associated details are transmitted (e.g., via a preprocessing request message, not separately shown) from a sender computing device 106 to the CPP device 120 prior to execution of the tentative transaction 108 on the blockchain 110. In some examples, the CPP device 120 provides an application programming interface (API) 130 that allows users such as the sender 102 to request evaluation of potential transactions such as the tentative transaction 108. In some examples, the CPP device 120 provides a user interface (UI) 132 that allows users to enter details about potential transactions, and view the various outputs generated by the CPP device 120 as described herein.

Upon receipt of the tentative transaction 108, the CPP device 120 evaluates how the tentative transaction 108 may impact the sender 102 and their sender wallet 112. More specifically, in examples, the CPP device 120 includes a risk scoring engine 122 that is configured to generate current risk score(s) (or just "current scores") 126 of the sender wallet, as well as predicted risk score(s) (or just "predicted scores") 128 of the sender wallet. Both the current scores 126 and the predicted scores 128 represent an evaluation of risk associated with transacting with the sender wallet 112, where the current scores 126 are scores evaluated without the tentative transaction 108 having been performed, and where the predicted scores 128 are scores evaluated as if the tentative transaction 108 were performed. In other words, the current scores 126 represent the current "trustworthiness" of the sender wallet 112 before the sender 102 transacts with the receiver 104, and the predicted scores 128 represent the resulting trustworthiness of the sender wallet 112 after the sender 102 transacts with the receiver 104.

Figure 2A:
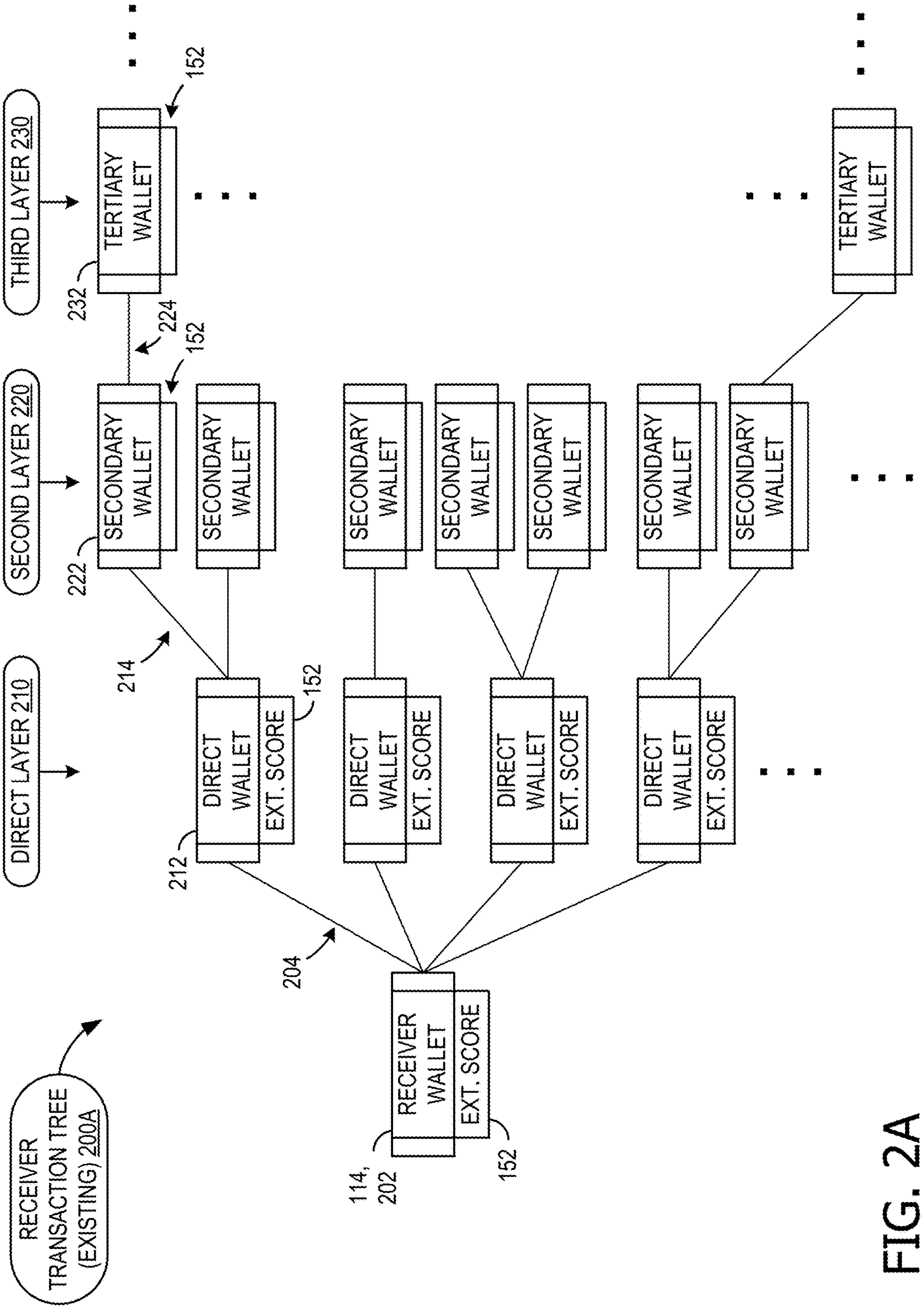
FIG. 2A and FIG. 2B illustrate example transaction trees for the receiver wallet, as generated by the risk scoring engine based on the transactions recorded in the blockchain of FIG. 1.
Figure 2B:
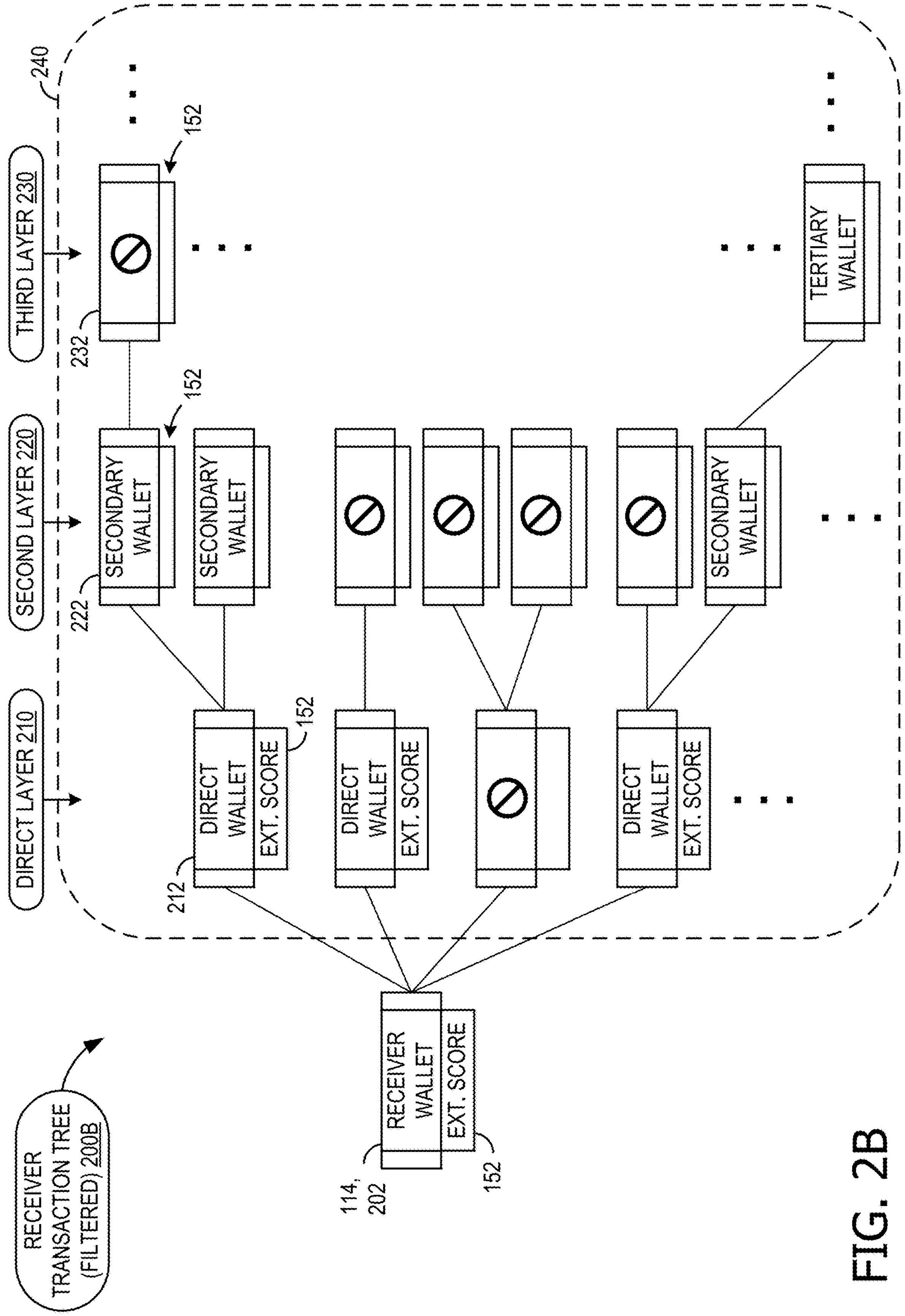
Figure 3A:
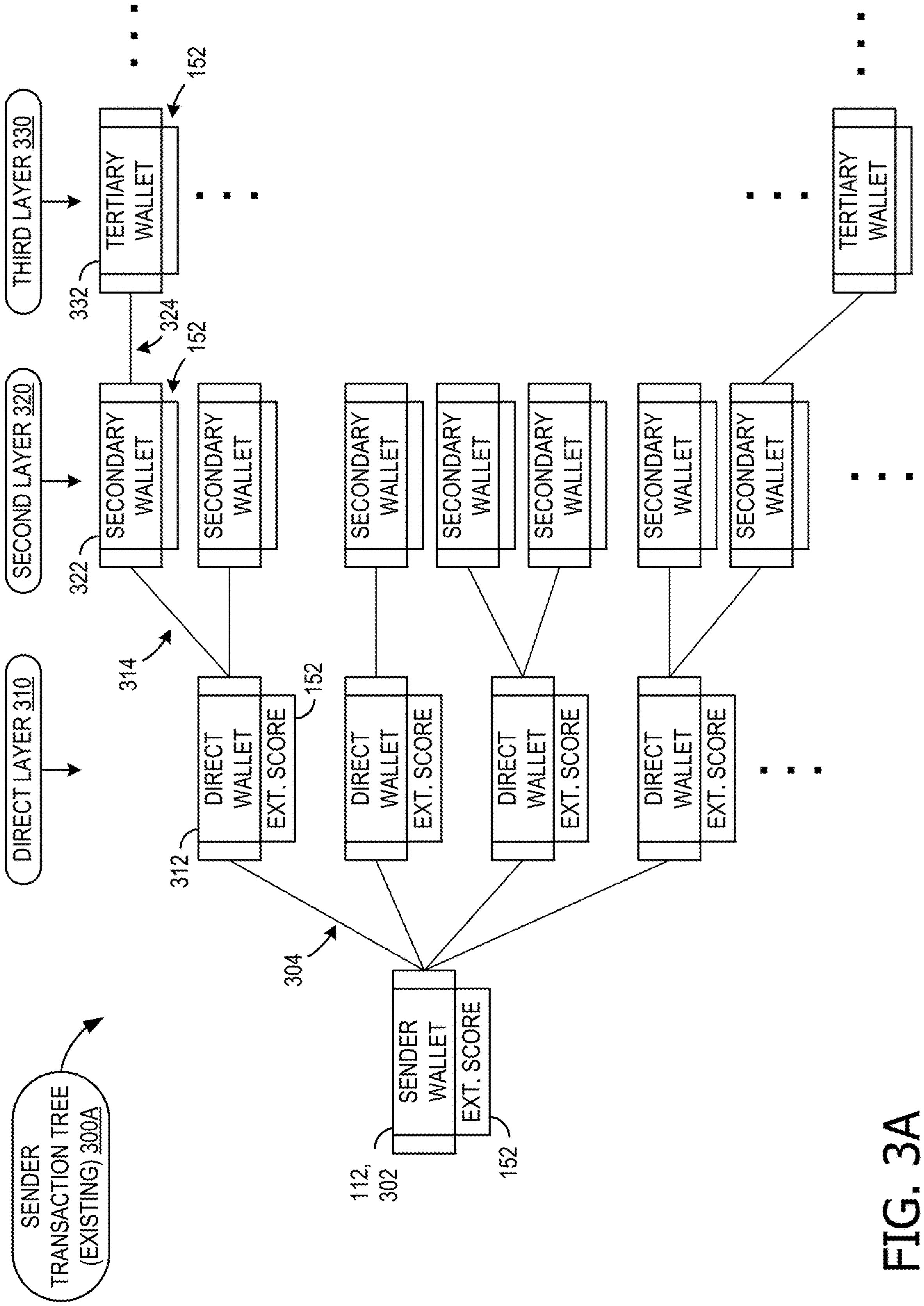
FIG. 3A, FIG. 3B, and FIG. 3C illustrate example transaction trees for the sender wallet, as generated by the risk scoring engine based on the transactions recorded in the blockchain of FIG. 1.
Figure 3B:
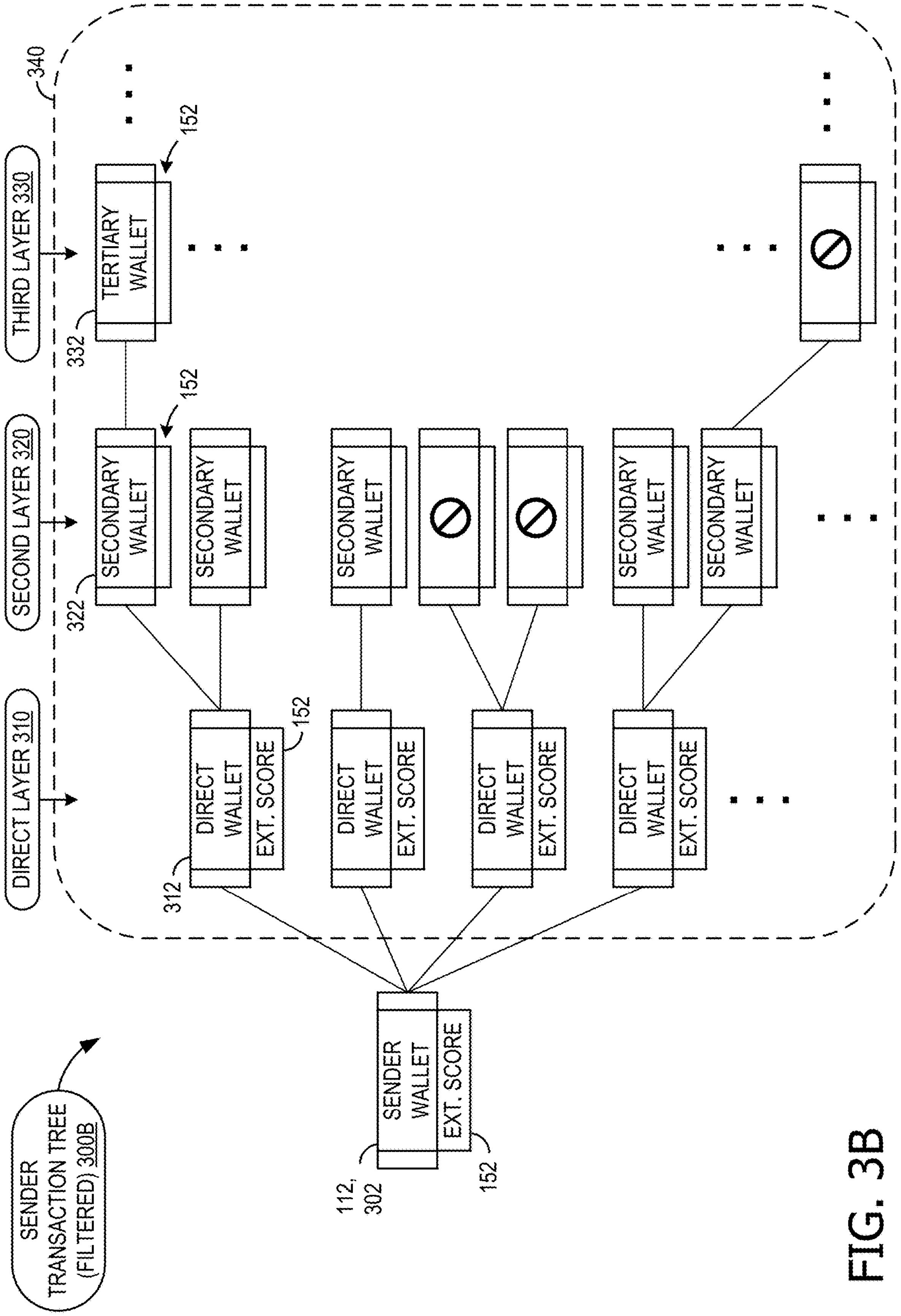
Figure 3C:
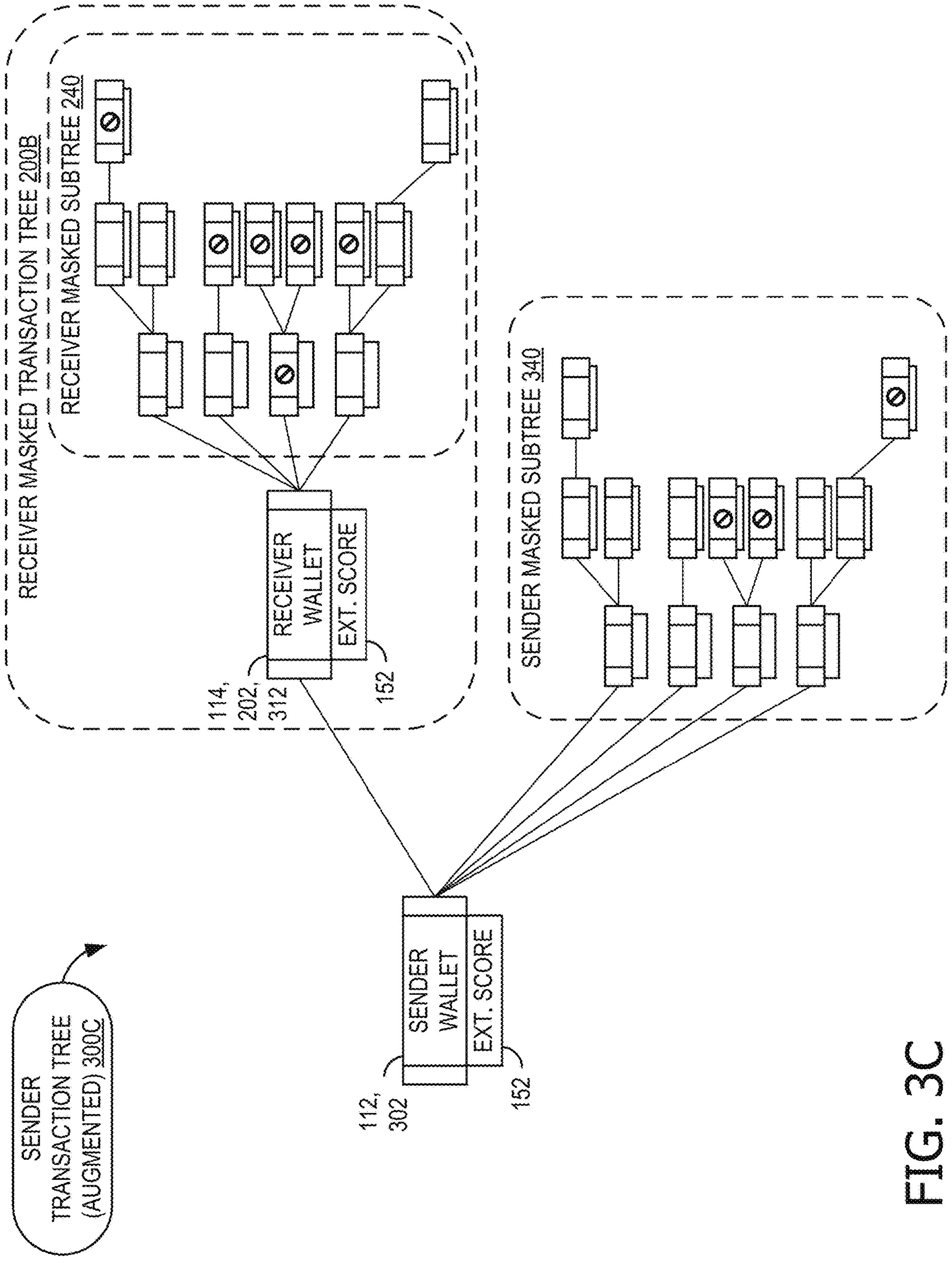

To generate these scores 126, 128, the CPP device 120 constructs transaction trees 124 for both the sender wallet 112 and the receiver wallet 114. In examples, these transaction trees 124 are constructed as graphs that map out the wallets/addresses within the blockchain 110 with which the sender wallet 112 or receiver wallet 114 have transacted. The transaction tree 124 of the sender wallet 112 includes the sender wallet 112 as the root node in that tree 124, and the transaction tree 124 of the receiver wallet 114 includes the receiver wallet 114 as the root node in that tree 124. Since the blockchain 110 includes a ledger of all transaction history between the various addresses, the risk scoring engine 122 can inspect the blockchain 110 to identify all of the other wallets with which the sender wallet 112 and receiver wallet 114 have directly transacted ("direct layer" wallets). Each of these direct layer wallets are added to the transaction tree 124 and connected to the root node of that tree 124 (either the sender wallet 112 or the receiver wallet 114). Likewise, for each of those direct layer wallets, the risk scoring engine 122 can also identify all of the other wallets with which those wallets have transacted, and thus add those "second layer" wallets to the tree 124. As such, the risk scoring engine 122 builds the transaction trees 124 for each of the sender wallet 112 and the receiver wallet 114 (e.g., out to some predefined depth, such as two layers, three layers, four layers). FIG. 2A to 2B provide example transaction trees 124 for the receiver wallet 114, and FIG. 3A to 3C provide example transaction trees 124 for the sender wallet 112. While each node in the trees 124 are described herein as being associated with a particular wallet, it should be understood that each node may also be associated with a particular transaction (e.g., the transaction that involved both that particular wallet and another wallet in the tree 124), the details of which may also be stored with that node (e.g., transaction value, timestamp of the transaction, and so forth).

The risk scoring engine 122 uses these transaction trees 124 to generate both the current scores 126 and the predicted scores 128. To generate these scores 126, 128, in examples, the risk scoring engine 122 uses two scoring sources, namely (1) an external scoring source (provided by external scoring service 150) and (2) an internal scoring source (implemented by the risk scoring engine 122).

In the example, the external scoring service 150 is a third-party service that provides risk scoring for cryptocurrency systems and their associated addresses/accounts/wallets. The external scoring service 150 is presumed to take scoring requests (not separately shown) from the CPP device 120 for particular wallets of particular cryptocurrency systems (e.g., the blockchain 110) and to return one or more risk scores for those wallets (represented in FIG. 1 as external scores 152). For any given wallet, these external scores 152 thus represent a current risk score for that wallet, as determined by whatever techniques and algorithms happen to be used by the external scoring service 150. Here, it is presumed that the external scoring service 150 only evaluates the identified wallet based on past/current transactions (e.g., based on the current state of the blockchain 110), and thus cannot incorporate a potential transaction such as the tentative transaction 108.

The risk scoring engine 122 utilizes this external scoring service 150 to identify risk scores for any or all of the wallets included in the transaction trees 124. These external scores 152 are referred to herein as "external" scores, as they originated from a source independent from the risk scoring engine 122. In the example, the risk scoring engine 122 transmits a scoring request to the external scoring service 150 for each of the wallets appearing in each of the transaction trees 124. As such, the external scoring service 150 returns one or more external scores 152 for each wallet appearing in the transaction trees 124. In some examples, the external scores 152 for a given wallet include a single risk score for that wallet. In other examples, the external scores 152 for a given wallet include multiple risk scores for that wallet, such as scores specific to a type of risk (e.g., a fraud risk score representing a likelihood of fraudulent activity associated with the wallet, a reputation risk score representing a reputation of the wallet based on its transaction history, a lending risk score representing risk associated with lending or borrowing activities involving the wallet, or the like) and/or a composite or overall risk score (e.g., a combination score derived from two or more of the specific risk scores).

These external scores 152 are used, in the internal scoring process, to evaluate risk scores for the sender wallet 112, both before the tentative transaction 108 and after. More specifically, in examples, the risk scoring engine 122 utilizes an internal scoring process, in conjunction with the transaction trees 124, to generate the current scores 126 and predicted scores 128 of the sender wallet 112. Initially, the risk scoring engine 122 uses the transaction tree 124 of the seller wallet 112, as well as the associated external scores of each wallet appearing therein, to generate the current score 126 (e.g., the tree 124 before consideration of the tentative transaction 108). This tree 124 is referred to herein as the "existing" sender transaction tree (an example of which is shown in FIG. 3A).

In some examples, the risk scoring engine 122 applies a set of filters to the existing sender transaction tree, resulting in a "filtered" sender transaction tree (an example of which is shown in FIG. 3B). The filters cause the risk scoring engine to filter out certain nodes from the tree based on certain criteria, such as, for example, a time filter (e.g., eliminating nodes from the tree that are associated with transactions that are older than a predetermined time, time period, length of time), a degree of separation filter (e.g., eliminating nodes that are beyond a predetermined distance from the root node), and/or a transaction value filter (e.g., eliminating nodes that have transaction values less than a predetermined value).

In the example, the risk scoring engine 122 uses the filtered sender transaction tree to compute the current score 126 for the sender wallet 112, where in other examples, the risk scoring engine 122 uses the existing sender transaction tree. The risk scoring provided by the internal scoring process is described in greater detail below with regard to FIG. 4.

Additionally, the risk scoring engine 122 combines the transaction tree 124 of the sender wallet 112 with the transaction tree 124 of the receiver wallet 114, and uses that "augmented" transaction tree to compute the predicted score 128. This augmented transaction tree is used to simulate what the transaction tree 124 of the sender wallet 112 would look like if the tentative transaction 108 were to be performed. More specifically, the root node of the receiver transaction tree 124 is attached as a direct node (e.g., a first layer relationship) to the root node of the sender transaction tree, thereby combining the entirety of the two trees. As such, this augmented transaction tree thus incorporates the tentative transaction 108 by adding the receiver wallet 114 to the transaction tree 124 of the sender, as well as any related nodes flowing from the receiver wallet 114. FIG. 2B provides an example (filtered) transaction tree for the receiver wallet 114, and FIG. 3C provides an example augmented transaction tree for the sender wallet 112 in which the (filtered) receiver transaction tree is added into the (filtered) transaction tree for the sender wallet 112.

In the example, the risk scoring engine 122 uses this augmented transaction tree, as well as the external scores for each of the nodes, to generate the predicted scores 128. More specifically, the risk scoring engine 122 uses the same internal scoring process as used to generate the current score 126 (which used the existing sender transaction tree, which does not include the receiver wallet 114) to also generate the predicted score 128 (using the augmented sender transaction tree, which does include the receiver wallet 114).

As such, the current scores 126 and the predicted scores 128 represent an internal score of the sender wallet 112 "before" the tentative transaction 108 and "after" the tentative transaction 108, respectively. In examples, the CPP device 120 returns these scores to the sender computing device 106 for presentation and display to the sender 102. In some examples, the risk scoring engine 122, additionally or alternatively, maps one or more of the scores 126, 128 onto a tiered list of risk ranks (e.g., "low risk", "medium risk", "high risk"; a set of cardinal numbers, "1", "2", "3", or the like), and the risk ranks may be displayed in addition, or alternatively, to the sender 102. In some examples, the risk scoring engine 122 displays an indication of a predicted change in the scores (e.g., an up or down arrow, or a change value, based on the difference between the current score 126 and the predicted score 128). In some examples, the CPP device 120 also sends a risk score of the receiver wallet 114 to the sender computing device 106 (e.g., the external score 152 of the receiver wallet 114, an internal score similarly generated for the receiver wallet 114 using the internal scoring process and the receiver transaction tree (existing or filtered)).

In some examples, the CPP device 120 allows the sender 102 to submit the tentative transaction 108 after display of the scores 126, 128. If the sender 102, for example, is content with the predicted changes provided by the risk scoring engine 122, the sender 102 submits the tentative transaction 108 (e.g., via a transaction execution message to the CPP device 120 or other device of the CPP system 100). In response, the CPP device 120 executes the tentative transaction 108 on the blockchain 110, thereby causing the transfer of the transaction amount from the sender wallet 112 to the receiver wallet 114.

FIG. 2A and FIG. 2B illustrate example transaction trees 124 for the receiver wallet 114, as generated by the risk scoring engine 122 based on the transactions recorded in the blockchain 110 of FIG. 1. During operation, and referring now to FIG. 2A, the risk scoring engine 122 generates an "existing" receiver transaction tree 200A for the receiver wallet 114. The existing receiver transaction tree 200A starts with a root node 202 for the receiver wallet 114. The transaction tree 200A, in the example, includes a direct layer 210 of direct nodes ("direct wallets 212"), a second layer 220 of nodes ("secondary wallets 222), and a third layer 230 of nodes ("tertiary wallets 232"). In some examples, more or less layers of nodes may be added into the tree 200A.

The direct wallets 212 represent wallets in the blockchain 110 with which the receiver wallet 114 has performed a direct transaction (e.g., where the receiver wallet 114 and the particular direct wallet 212 are one of the sender party or receiver party in the same transaction). Edges 204 connect the root node 202 with the direct wallets 212, and each edge 204 represents one or more transactions between the receiver wallet 114 and that particular direct wallet 212. Likewise, the secondary wallets 222 represent wallets in the blockchain 110 with which some particular direct wallet 212 appearing in the tree 200A has performed a direct transaction (e.g., where the particular direct wallet 212 and the particular secondary wallet 222 are one of the sender party or receiver party in the same transaction). Edges 214 connect one of the direct wallets 212 with one of the secondary wallets 222, and each edge 214 represents one or more transactions between that direct wallet 212 and that secondary wallet 222. Similarly, the tertiary wallets 232 have a similar transactional relationship with one of the secondary wallets 222 appearing in the tree 200A, and edges 224 connect one of the secondary wallets 222 with one of the tertiary wallets 232, where each edge 224 represents one or more transactions between that secondary wallet 222 and that tertiary wallet 232.

In the example, to construct the tree 200A, the risk scoring engine 122 traverses the blockchain 110 to identify all of the transactions in which the receiver wallet 114 is a party (e.g., as sender or receiver). For each of these "direct transactions" identified in this initial traversal, the risk scoring engine 122 adds a new node in the direct layer 210 for that direct transaction, identifying the other party to the transaction as the direct wallet 212 for that node (and that transaction as the transaction and details associated with that node), and connecting that direct wallet 212 to the root node 202. As such, this initial traversal identifies all direct wallets 212 with which the receiver wallet 114 has directly transacted, adding those wallets 212 into the tree 200A.

The risk scoring engine 122 then similarly traverses the blockchain 110 for each direct wallet, thereby identifying all transactions involving that particular direct wallet 212 as a party (e.g., as sender or receiver, excluding transactions involving the receiver wallet 114, as that relationship is already incorporated into the tree 200A). For each of the identified transactions involving that particular direct wallet 212, the risk scoring engine 122 adds a new node in the secondary layer 220, similarly identifying the other party to the transaction as the secondary wallet 222 for that node (as well as the transaction), and connecting that secondary wallet 222 to the direct wallet 212. As such, this set of secondary traversals identifies all secondary wallets 222 that have transacted with all of the direct wallets 212, adding those secondary wallets 222 into the tree 200A.

Likewise, the risk scoring engine 122 similarly traverses the blockchain 110 for all secondary wallets 222, adding tertiary wallets 232 to each secondary wallet 222 as they appear in the blockchain. In this example, the risk scoring engine 122 is configured to create three layers beneath the root node 202, namely the direct layer 210, the second layer 220, and the third layer 230. In other examples, the tree 200A may be created with more or fewer layers.

In the example, for each node appearing in the tree 200A, the risk scoring engine 122 requests an external score 152 for the wallet 114, 212, 222, 232 associated with that node. For example, and as shown in FIG. 1, the risk scoring engine 122 transmits a scoring request to the external scoring service 150, including the address of the wallets 114, 212, 222, 232. In response, the risk scoring engine 122 receives the external scores 152 and stores those for each wallet in the tree 200A (as illustrated by external scores 152 attached to their respective nodes in the tree 200A).

FIG. 2B illustrates a filtered receiver transaction tree 200B after a set of filters has been applied to the existing receiver transaction tree 200A of FIG. 2A. In examples, after the existing receiver transaction tree 200A has been created, the risk scoring engine 122 applies a set of filters to the existing receiver transaction tree 200A, resulting in the filtered receiver transaction tree 200B. The application of this set of filters causes some of the nodes to be removed or otherwise excluded from the tree 200B. These filtered nodes are identified in FIG. 2B with the "prohibition symbol" or "no symbol" (e.g., a slashed circle). In the example, several nodes have been removed from the tree 200B. Further, FIG. 2B identifies a subgraph referred to herein as receiver masked subtree 240, which is discussed in relation to FIG. 3C. Additional details regarding the creation and editing of the trees 200A, 200B are described below with respect to FIG. 4A.

FIGS. 3A, 3B, and 3C illustrate example transaction trees 124 for the sender wallet 112, as generated by the risk scoring engine 122 based on the transactions recorded in the blockchain 110 of FIG. 1. During operation, and referring now to FIG. 3A, the risk scoring engine 122 generates an "existing" sender transaction tree 300A for the sender wallet 112. The existing sender transaction tree 300A starts with a root node 302 for the sender wallet 112. Like the transaction tree 200A of FIG. 2A, the transaction tree 300A, in the example, includes a direct layer 310 of direct nodes ("direct wallets 312"), a second layer 320 of nodes ("secondary wallets 322), and a third layer 330 of nodes ("tertiary wallets 332"). In some examples, more or less layers of nodes may be added into the tree 300A.

Similar to the wallets 212, 222, 232 of FIG. 2A, the wallets 312, 322, 332 also represent wallets in the blockchain 110 with which the sender wallet 112 has performed direct transactions, secondary transactions between direct wallets 312 and secondary wallets 322, and tertiary transactions between secondary wallets 322 and tertiary wallets 332, respectively, each of which are likewise connected by edges 304, 314, 324 that represent transactions between two of those wallets 312, 322, 332 (e.g., similar to the edges 204, 214, 224 shown in FIG. 2A). In the example, to construct the tree 300A, the risk scoring engine 122 similarly traverses the blockchain 110 to identify all of the transactions in which the sender wallet 112 is a party, adding nodes for each direct wallet 312, traverses the blockchain 110 to identify all of the transactions involving each of the secondary wallets 322 with which any of the direct wallets 312 were involved, and traverses the blockchain 110 to identify all of the transactions involving each of the tertiary wallets 332 with which any of the secondary wallets 322 were involved, adding nodes and edges similar to the creation of the receiver transaction tree 200A of FIG. 2A. Likewise, for each node appearing in the tree 300A, the risk scoring engine 122 requests an external score 152 for the wallet 1124, 312, 322, 332 associated with that node, as described in FIG. 2A.

FIG. 3B similarly illustrates a filtered sender transaction tree 300B after a set of filters has been applied to the existing sender transaction tree 300A of FIG. 3A. In examples, after the existing sender transaction tree 300A has been created, the risk scoring engine 122 applies a set of filters to the existing sender transaction tree 300A, resulting in the filtered sender transaction tree 300B. Similar to that shown in FIG. 2B, the application of this set of filters causes some of the nodes to be removed or otherwise excluded from the tree 300B. Further, FIG. 3B identifies a subgraph referred to herein as sender masked subtree 340, which is discussed in relation to FIG. 3C.

In examples, the risk scoring engine 122 uses either the existing sender transaction tree 300A or the filtered sender transaction tree 300B to generate the current score(s) 126 of FIG. 1. Additional details regarding the creation and editing of the trees 300A, 300B, as well as the use of those trees 300A, 300B to generate the current score(s) 126 are described below with respect to FIG. 4B.

FIG. 3C illustrates an example augmented sender transaction tree 300C that simulates the inclusion of the tentative transaction 108 and the receiver wallet 114 into the sender transaction trees 300A, 300B. In the example, the risk scoring engine 122 adds the receiver masked transaction tree 200B into the filtered sender transaction tree 300B to generate the augmented sender transaction tree (or just "augmented tree") 300C as shown in FIG. 3C. More specifically, the augmented tree 300C includes all of the filtered sender transaction tree 300B, namely the sender wallet 112 as the root node 302, as well as the sender masked subtree 340 (e.g., all of the direct wallets 312, secondary wallets 322, and tertiary wallets 332 as shown in FIG. 3B).

In addition, the receiver masked transaction tree 200B is added to this augmented tree 300C by attaching the root node 202 of the receiver masked transaction tree 200B (e.g., the receiver wallet 114) to the root node 302 of the augmented tree 300C. As such, the receiver wallet 114 becomes an additional direct wallet 312 within the direct layer 310 of the augmented tree 300C. Likewise, all of the receiver masked subtree 240 is connected to the receiver wallet 114, thus adding those direct wallets 212, secondary wallets 222, and tertiary wallets 232 as secondary wallets 322, tertiary wallets 332, and quaternary wallets in the augmented tree 300C. Accordingly, once complete, the augmented tree 300C represents the transaction tree of the sender wallet 112 if the tentative transaction 108 were to have been performed (e.g., if the sender wallet 112 had transacted with the receiver wallet 114).

In some examples, the receiver existing transaction tree 200A is added instead of the receiver masked transaction tree 200B. In some examples, the sender existing transaction tree 300A is augmented with the receiver existing transaction tree 200A and the filters are applied after the augmented tree 300C is created.

In examples, the risk scoring engine 122 uses the augmented tree 300C to generate the predicted score(s) 128 of FIG. 1. Additional details regarding the creation and editing of the augmented tree 300C, as well as the use of the augmented tree 300C to generate the predicted score(s) 128 is described below with respect to FIG. 4B.

Figure 4A:
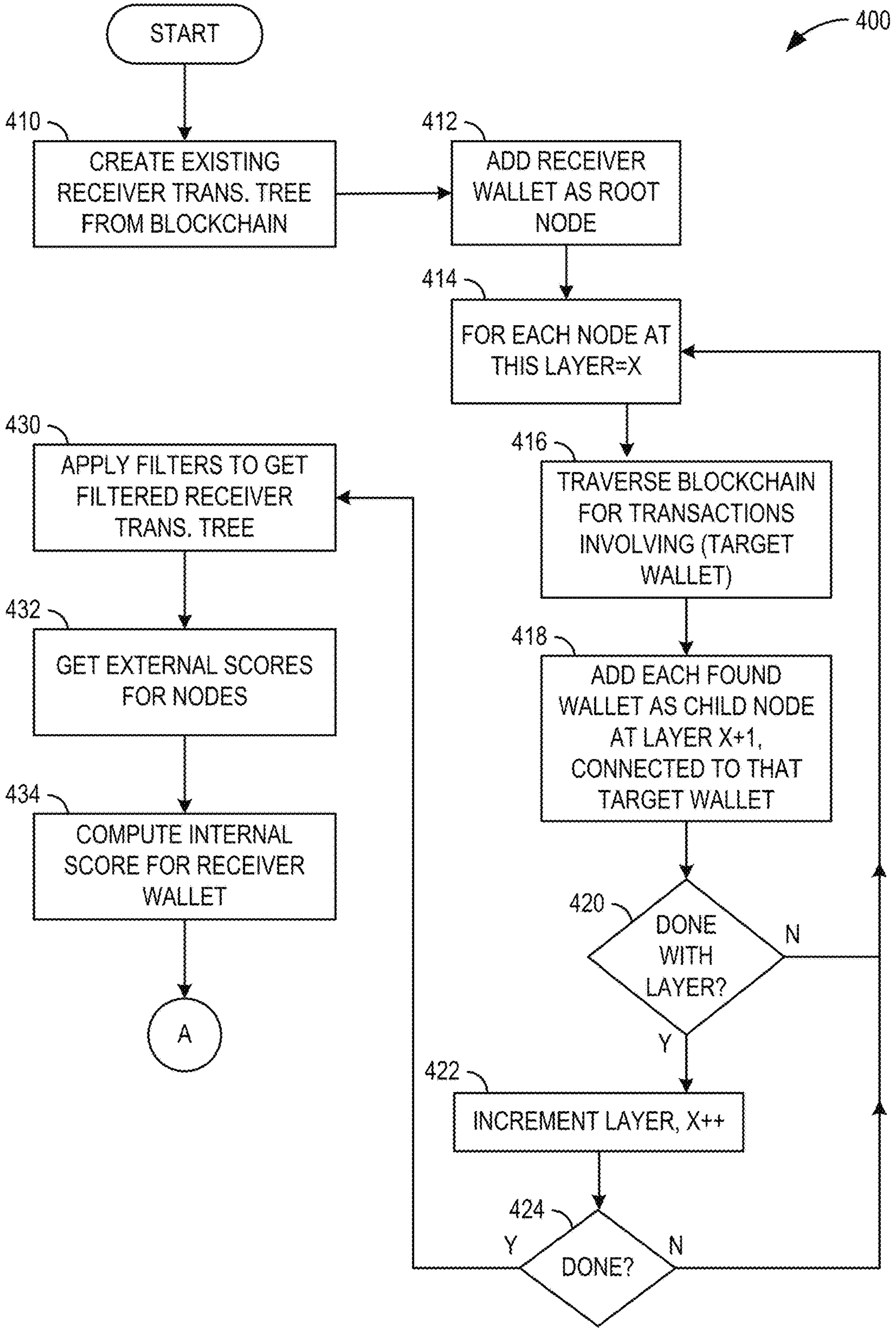
FIG. 4A and FIG. 4B illustrate an example process for generating the current scores and predicted scores for the sender wallet in consideration of the tentative transaction shown in FIG. 1.
Figure 4B:
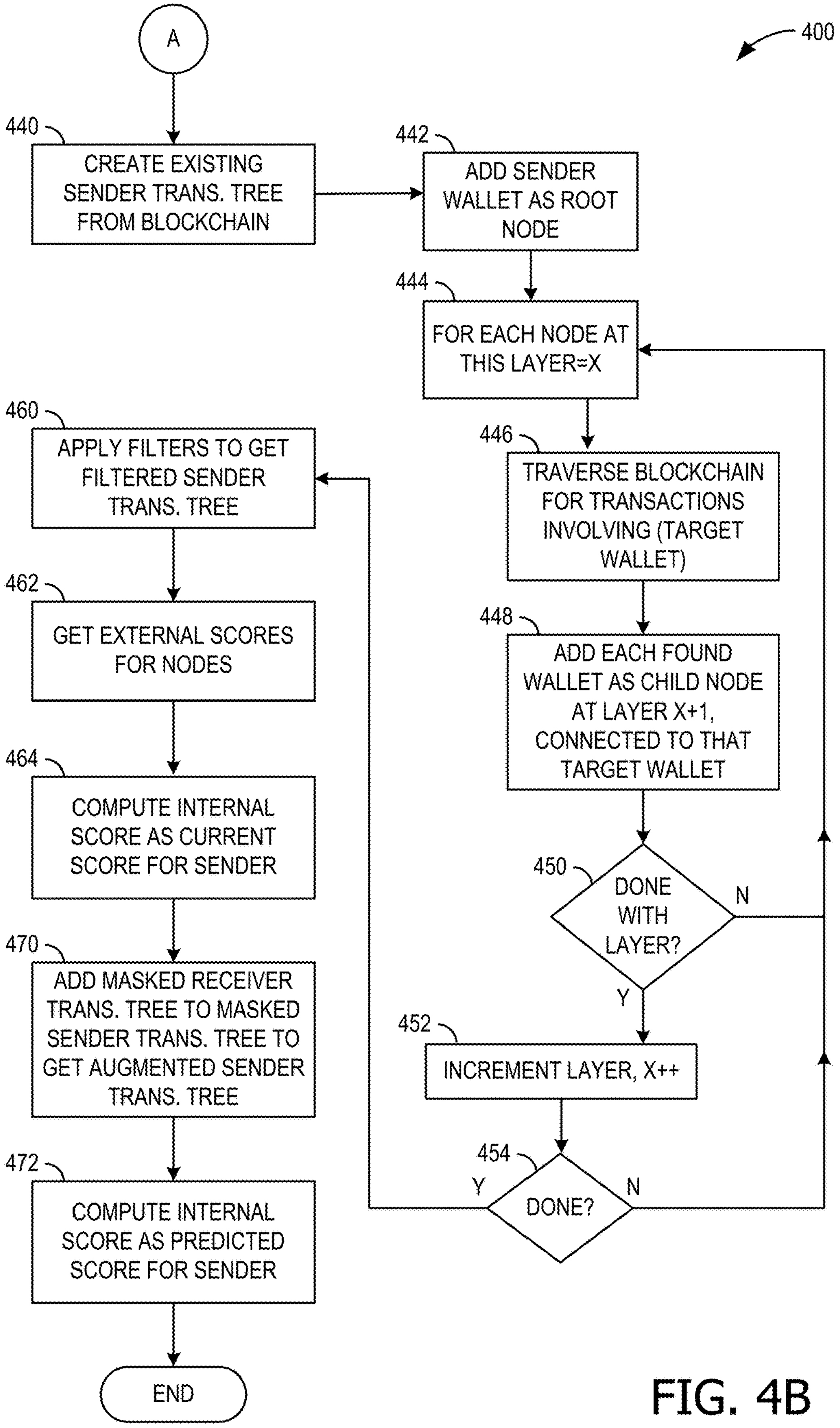

FIG. 4A and FIG. 4B illustrate an example process 400 for generating the current scores 126 and predicted scores 128 for the sender wallet 112 in consideration of the tentative transaction 108 shown in FIG. 1. In the example, the risk scoring engine 122 of FIG. 1 performs the operations of the process 400 within the CPP system 100 of FIG. 1. FIG. 4A illustrates operations performed to generate the transaction trees associated with the receiver 104 and the receiver wallet 114 (e.g., the existing receiver transaction tree 200A of FIG. 2A and the filtered receiver transaction tree 200B of FIG. 2B). FIG. 4B illustrates operations performed to generate the transaction trees associated with the sender 102 and the sender wallet 112 (e.g., the existing sender transaction tree 300A of FIG. 3A, the filtered sender transaction tree 300B of FIG. 3B, and the augmented sender transaction tree 300C of FIG. 3C).

Referring now to FIG. 4A, at operation 410, the risk scoring engine 122 creates the existing receiver transaction tree 200A using the blockchain 110. Operations 412 to 422 illustrate a process for creating the tree 200A. More specifically, at operation 412, the risk scoring engine 122 adds the receiver wallet 114 as the root node 202 of the tree 200A. As described above, this root node 202 includes information about the receiver wallet 114, such as an address associated with the wallet 114 on the blockchain 110. The risk scoring engine 122 then enters an iterative loop at operation 414.

More specifically, for each node at this first layer (e.g., the layer of the root node 202), the risk scoring engine 122 traverses the blockchain 110 at operation 416, looking for any and all recorded transactions that involve the target node (e.g., the address associated with the root node 202, the receiver wallet 114), as either the sender party or the receiver party. In the example shown in FIG. 2A, this traversal identifies four direct wallets 212 with which the receiver wallet 114 has transacted. At operation 418, the risk scoring engine 122 adds a new node for each found wallet as a child node of the root node 202 (e.g., the four direct wallets 212 shown in FIG. 2A), connecting each of these direct wallets 212 to the root node 202. In examples, the risk scoring engine 122 also extracts, from the associated blockchain transactions, some data associated with each of the direct wallets 212 and their associated transactions, such as, for example, an address of each of the direct wallets 212, a transaction amount of the identified transaction, which party was the sender and receiver in the transaction, a timestamp of the transaction, and the like. Such information is retained and stored for each of the wallets 212, 222, 232 added to the tree 200A.

At test 420, if there are more nodes at the current layer still to be processed, the risk scoring engine 122 returns to operation 414. Since there is only one node (the root node 202) at the first (root) layer, the risk scoring engine 122 proceeds to operation 422, incrementing the layer to the next deeper layer. After this first iteration, the risk scoring engine 122 advances from the root layer to the direct layer 210. At test 424, the risk scoring engine 122 tests whether the building of the tree 200A is complete. In the example, a layer threshold is predefined to be the third layer 230. In other words, the tertiary wallets 232 are the last nodes to be added to the tree 200A, and thus test 424 will succeed when the current layer has reached the third layer 230. Currently, in this example, the current layer is now at the direct layer 210, and thus the risk scoring engine 122 returns to operation 414 for another iteration.

In this example, there are four direct wallets 212 at the direct layer 210. As such, for each of those four direct wallets 212, at operation 416, the risk scoring engine 122 likewise traverses the blockchain 110 looking for any and all transactions involving one of the four direct wallets 212 (e.g., as the "target wallet"). At operation 418, for each transaction involving another wallet (excluding the receiver wallet 114), a new node is added to the tree 200A at the next deeper layer (e.g., as a secondary wallet 222 at the second layer 220) and connected to the associated direct wallet 212 with which the transaction occurred. Similarly, the risk scoring engine 122 collects data about that transaction and the secondary wallet 222, retaining that information for later use. At test 420, after processing all four direct wallets 212, the risk scoring engine 122 is done with the direct layer 210 and increments the layer to the second layer 220 at operation 422. At test 424, since the layer has not yet reached the third layer (the example stopping point), the risk scoring engine 122 returns to operation to begin processing the nodes in the second layer 220.

Similar to the root and direct layers, the risk scoring engine 122 traverses the blockchain 110 searching for any and all transactions involving all of the secondary wallets 222 at operation 416, likewise adding each found wallet as a child node (e.g., as a tertiary wallet 232 at the third layer 230), and being attached to the respective secondary wallet 232 at operation 418. Once complete and done with the secondary layer 220 at test 420, the layer is incremented to the third layer 230 at operation 422. Now, at test 424, the tree 200A is identified as complete (e.g., since the current layer is the third layer). As such, the risk scoring engine 122 advances to operation 430.

At operation 430, in the example, the risk scoring engine 122 applies a set of filters to the existing receiver transaction tree 200A, thereby changing that tree 200A into the filtered receiver transaction tree 200B shown in FIG. 2B. The set of filters identifies criteria with which nodes (e.g., wallets 212, 222, 232) are removed or otherwise excluded from the tree 200A. As described above, these filters may be based on, for example, transaction age (e.g., removing wallets 212, 222, 232 where the associated transaction is older than an amount of time, or had occurred prior to a particular point in time), transaction amount (e.g., removing wallets 212, 222, 232 where the associated transaction is less than a threshold amount), transaction depth (e.g., removing wallets 212, 222, 232 that are too many steps or layers removed from the root node 202), or the like. As such, in the example shown in FIG.

2B, several wallets 212, 222, 232 have been excluded from the filtered receiver transaction tree 200B.

At operation 432, the risk scoring engine 122 gets external scores 152 for each of the remaining wallets 212, 222, 232 in the tree 200B. In the example, the risk scoring engine 122 sends the identities (e.g., blockchain addresses) of each of the remaining wallets 212, 222, 232 to the external scoring service 150 as shown and described in FIG. 1, receiving the external scores 152 in response. Each of these external scores 152 are stored with their associated wallets 212, 222, 232.

At operation 434, in some examples, the risk scoring engine 122 computes an internal score for the receiver wallet 114. This internal score for the receiver wallet 114 is computed similar to the weighted or unweighted internal scores for the sender wallet 112, as shown and described below in relation to FIG. 4B. In some examples, the internal score for the receiver wallet 114 may be created using the existing receiver transaction tree 200A (e.g., unfiltered) or the filtered receiver transaction tree 200B of FIG. 2B, and may be weighted or unweighted.

Upon completion of these operations of FIG. 4A, the transaction trees 200A, 200B for the receiver wallet 114 are complete, and the process 400 continues to the operations of FIG. 4B.

Referring now to FIG. 4B, at operation 440, the risk scoring engine 122 creates the existing sender transaction tree 300A using the blockchain 110. Similar to the operations 412 to 424 of FIG. 4A, operations 442 to 454 likewise illustrate a process for creating the existing sender transaction tree 300A. More specifically, at operation 442, the risk scoring engine 122 adds the sender wallet 112 as the root node 302 of the tree 300A. As described above, this root node 302 includes information about the sender wallet 112, such as an address associated with the sender wallet 112 on the blockchain 110. The risk scoring engine 122 then enters an iterative loop at operation 444.

More specifically, for each node at this first layer (e.g., the layer of the root node 302), the risk scoring engine 122 traverses the blockchain 110 at operation 446, looking for any and all recorded transactions that involve the target node (e.g., the address associated with the root node 302, the sender wallet 112), as either the sender party or the receiver party. In the example shown in FIG. 3A, this traversal identifies four direct wallets 312 with which the sender wallet 112 has transacted. At operation 448, the risk scoring engine 122 adds a new node for each found wallet as a child node of the root node 302 (e.g., the four direct wallets 312 shown in FIG. 3A), connecting each of these direct wallets 312 to the root node 302. In examples, the risk scoring engine 122 also extracts, from the associated blockchain transactions, some data associated with each of the direct wallets 312 and their associated transactions, such as, for example, an address of each of the direct wallets 312, a transaction amount of the identified transaction, which party was the sender and receiver in the transaction, a timestamp of the transaction, and the like. Such information is likewise retained and stored for each of the wallets 312, 322, 332 added to the tree 300A.

At test 450, if there are more nodes at the current layer still to be processed, the risk scoring engine 122 returns to operation 444. Since there is only one node (the root node 302) at the first (root) layer, the risk scoring engine 122 proceeds to operation 452, incrementing the layer to the next deeper layer. After this first iteration, the risk scoring engine 122 advances from the root layer to the direct layer 310. At test 454, the risk scoring engine 122 tests whether the building of the tree 300A is complete. In the example, a layer threshold is predefined to be the third layer 330. In other words, the tertiary wallets 332 are the last nodes to be added to the tree 300A, and thus test 454 will succeed when the current layer has reached the third layer 330. Currently, in this example, the current layer is now at the direct layer 310, and thus the risk scoring engine 122 returns to operation 444 for another iteration.

In this example, there are four direct wallets 312 at the direct layer 310. As such, for each of those four direct wallets 312, at operation 446, the risk scoring engine 122 likewise traverses the blockchain 110 looking for any and all transactions involving one of the four direct wallets 312 (e.g., as the "target wallet"). At operation 448, for each transaction involving another wallet (excluding the sender wallet 112), a new node is added to the tree 300A at the next deeper layer (e.g., as a secondary wallet 322 at the second layer 320) and connected to the associated direct wallet 312 with which the transaction occurred. Similarly, the risk scoring engine 122 collects data about that transaction and the secondary wallet 322, retaining that information for later use. At test 450, after processing all four direct wallets 312, the risk scoring engine 122 is done with the direct layer 310 and increments the layer to the second layer 320 at operation 452. At test 454, since the layer has not yet reached the third layer (the example stopping point), the risk scoring engine 122 returns to operation to begin processing the nodes in the second layer 320.

Similar to the root and direct layers, the risk scoring engine 122 traverses the blockchain 110 searching for any and all transactions involving all of the secondary wallets 322 at operation 446, likewise adding each found wallet as a child node (e.g., as a tertiary wallet 332 at the third layer 330), and being attached to the respective secondary wallet 332 at operation 448. Once complete and done with the secondary layer 320 at test 450, the layer is incremented to the third layer 330 at operation 452. Now, at test 454, the tree 300A is identified as complete (e.g., since the current layer is the third layer). As such, the risk scoring engine 122 advances to operation 460.

At operation 460, in the example, the risk scoring engine 122 applies a set of filters to the existing sender transaction tree 300A, thereby changing that tree 300A into the filtered sender transaction tree 300B shown in FIG. 3B. The set of filters identifies criteria with which nodes (e.g., wallets 312, 322, 332) are removed or otherwise excluded from the tree 300A. In the example, these filters are the same filters used to generate the filtered receiver transaction tree 200B as described above. In other examples, these filters may be a different set of filters. As such, in the example shown in FIG. 3B, several wallets 312, 322, 332 have been excluded from the filtered sender transaction tree 300B.

At operation 462, the risk scoring engine 122 gets external scores 152 for each of the remaining wallets 312, 322, 332 in the tree 300B. In the example, the risk scoring engine 122 sends the identities (e.g., blockchain addresses) of each of the remaining wallets 312, 322, 332 to the external scoring service 150 as shown and described in FIG. 1, receiving the external scores 152 in response. Each of these external scores 152 are stored with their associated wallets 312, 322, 332.

At operation 464, the risk scoring engine 122 computes a first internal score(s) for the sender wallet 112 using the filtered sender transaction tree 300B. These first internal scores are used as the current score(s) 126 shown in FIG. 1. More specifically, since these first internal scores are generated based on the filtered sender transaction tree 300B (which notably does not include the receiver wallet 114 or the tentative transaction 108), the first internal scores are scores that represent the current state of the sender wallet 112 (e.g., before engaging in the tentative transaction 108 with the receiver 104).

More specifically, these internal scores are generated using an internal scoring process that leverages the tree 300B, and particularly the external scores 152 of the nodes in that tree 300B. Each of the remaining wallets 312, 322, 332 in the tree 300B have one or more external scores 152. As such, in some examples, the risk scoring engine 122 sums the external scores 152 of each of those wallets 312, 322, 332 and divides that total by the number of wallets 312, 322, 332, thereby generating an average score. This average score is then used as the current score 126 for the sender wallet 112. In some examples, each wallet 312, 322, 332 may include multiple external scores 152 for that wallet (e.g., a fraud risk score, a reputation risk score, a lending risk score, a combination or composite score). As such, each of these sub-scores may be similarly averaged to generate the current scores 126.

In some examples, weights may be applied to the direct wallets of the tree 300B when calculating the current scores 126. Weights may be used to influence the relative influence of each particular node (e.g., the external score(s) 152 of that wallet 312, 322, 332) in the tree 330B. A scale of weighting may be predefined for one or more weighting factors, such as, for example, transaction recency (e.g., via age of the transaction, such as block age, the difference between the date/time of the transaction associated with this wallet 312, 322, 332 and the current time, where older transactions are given lower weights, and thus less influence), transaction depth (e.g., how many layers 310, 320, 330 this transaction/wallet 312, 322, 332 is removed from the sender wallet 112, where more distant transactions/wallets 312, 322, 332 are given lower weights), and/or transaction amount (e.g., the value exchanged in the transaction, where lower values are given lower weights). As such, the risk scoring engine 122 may apply weighted averaging using any or all of these weights to generate a weighted average when determining the current scores 126.

As such, the risk scoring engine 122 uses the filtered sender transaction tree 300B and the associated external scores 152 of the wallets 312, 322, 332 to generate the current score(s) 126 for the sender wallet 112. As discussed above, this current score 126 represents an internal score generated by the risk scoring engine 122 based on this internal scoring process as described above. This current score 126 thus embodies the internal score of the sender wallet 112 prior to (without considering) the tentative transaction 108.

At operation 470, in examples, the risk scoring engine 122 creates a combined tree by inserting the filtered receiver transaction tree 200B into the filtered sender transaction tree 300B to generate the augmented sender transaction tree 300C. As described above in relation to FIG. 3C, this augmented sender transaction tree 300C adds the receiver wallet 114 as a direct layer 310 node (e.g., as if the tentative transaction 108 were performed between the sender wallet 112 and the receiver wallet 114). Further, all of the connected nodes of the receiver masked subtree 240 are connected to the receiver wallet 114 within this tree 300C, thus adding all of the receiver masked transaction tree 200B into this augmented tree 300C. In some examples, the risk scoring engine 122 may, additionally or alternatively, (re) apply any of the filters to the tree 300C.

As such, at operation 472, the risk scoring engine 122 uses the augmented sender transaction tree 300C to compute another internal score as the predicted score(s) 128 for the sender wallet 112. The scoring of operation 472 is performed similar to calculating the current score 126, as described above in relation to operation 464, but using this augmented sender transaction tree 300C (the "after" picture) instead of the filtered sender transaction tree 300B (the "before" picture). In other words, the risk scoring engine 122 uses the external scores 152 of the nodes in the tree 300C to generate average score(s) or weighted average score(s) for the sender wallet 112. As such, these internal score(s) are used as the predicted score(s) 128 for the sender wallet 112.

As discussed above in relation to FIG. 1, these current score(s) 126 and predicted score(s) 128 thus represent internal scores generated by the risk scoring engine 122 for the sender wallet 112, as evaluated before the tentative transaction 108 is performed (which is the current state of the blockchain 110) and after the tentative transaction 108, respectively. These results may be transmitted to the sender computing device 106 for viewing by the sender 102.

Figure 5A:
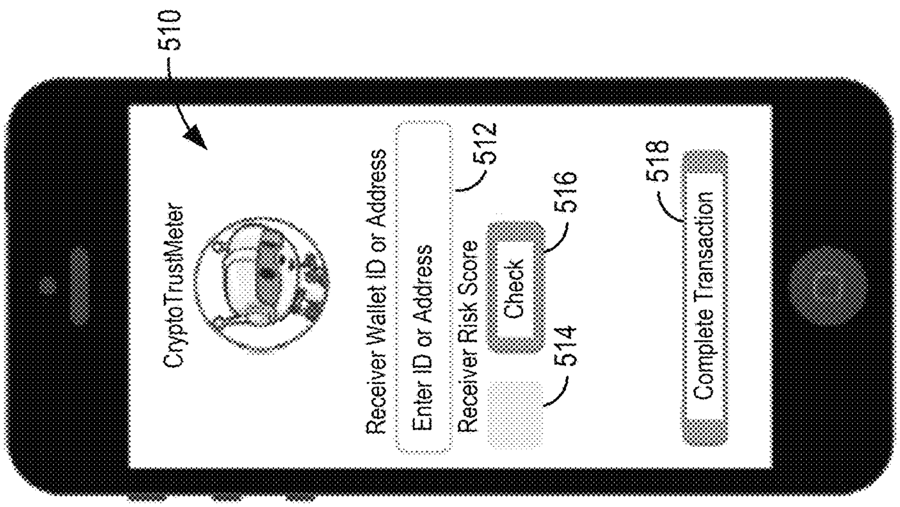
FIG. 5A, FIG. 5B, and FIG. 5C illustrate an example sequence of screenshots that are provided by the user interface (UI) of FIG. 1 to the sender via the sender computing device.
Figure 5B:
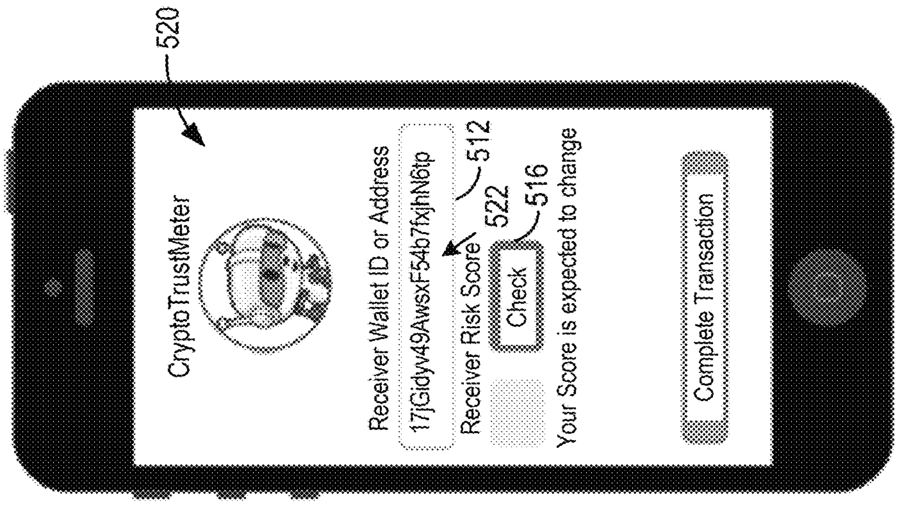
Figure 5C:
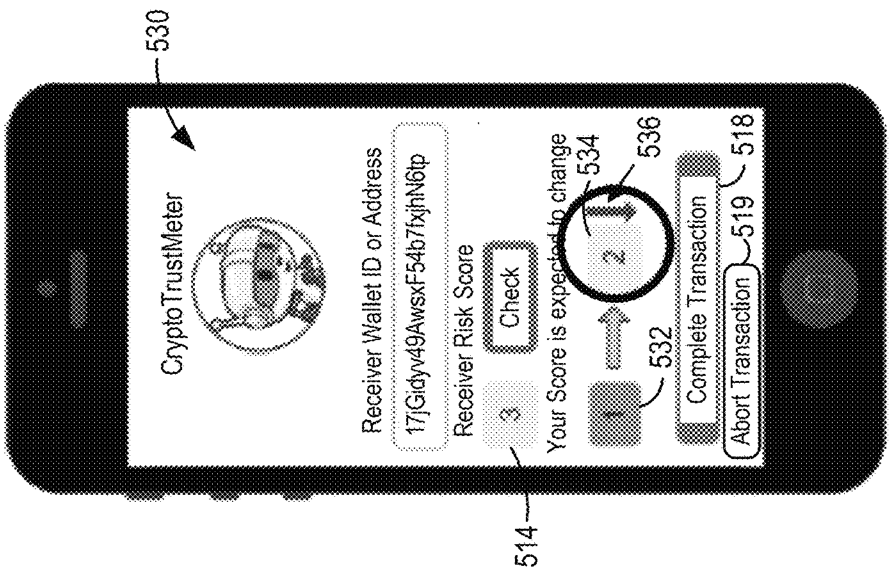

FIG. 5A to FIG. 5C illustrate an example sequence of screenshots 510, 520, 530 that are provided by the UI 132 of FIG. 1 to the sender 102 via the sender computing device 106. In this example, the sender computing device 106 is a mobile device (e.g., a smartphone), and the UI 132 includes an app installed on the sender computing device 106 that interacts with the CPP device 120 during operation. In FIG. 5A, the screenshot 510 includes a receiver wallet input box 512 (currently empty) in which the sender 102 can input the identity of a party with which they are considering transacting on the blockchain 110. The screenshot 510 also includes a receiver risk rating box 514 (currently empty) that is configured to display a risk score of the receiver, a "Check" button 516, and a "Complete Transaction" button 518.

In FIG. 5B, in this example, the sender 102 inputs a wallet ID 522 of the receiver 104 (e.g., an address of the receiver wallet 114 within the blockchain 110) into the receiver wallet input box 512. In some examples, the UI 132 may also accept a transaction amount as input (not shown in FIGS. 5A-5C). Here, after inputting the wallet ID 522 of the receiver 104, the sender 102 presses the "Check" button 516, thus causing the CPP system 100 to score the tentative transaction 108 between the sender wallet 112 and the receiver wallet 114, as described above.

In FIG. 5C, the screenshot 530 populates a risk score of the receiver wallet 114 into the receiver risk rating box 514 (e.g., an internal risk score generated by the risk scoring engine 122 using either of the trees 200A, 200B for the receiver). This example displays a risk score of "3" for the receiver 104. Further, the screenshot 530 also displays a current risk score of "1" for the sender 102 (e.g., based on the current risk score(s) 126) in a sender current score box 532, as well as a predicted risk score of "2" for the sender 102 if they were to perform the tentative transaction 108 with the receiver 104 (e.g., based on the predicted risk score(s) 128), in a sender predicted score box 534. As such, in this example, the CPP system 100 is predicting that the risk score of the sender 102 will increase from "1" to "2" if the sender 102 performs this tentative transaction 108 with the receiver 104. The screenshot 530 also includes a direction change arrow 536 that illustrates the risk rating increase to the sender 102 (e.g., where down arrow identifies an increase in risk).

In some examples, the CPP device 120 may be configured to perform the tentative transaction 108 on the blockchain 110 (e.g., transmitting the tentative transaction 108 to a network of computers (not separately shown) that participate in the blockchain 110). For example, after viewing the results of the risk scoring as shown in FIG. 5C, the sender 102 may decide to go ahead with the tentative transaction 108, and thus clicks on the "Complete Transaction" button 518. This causes the CPP device 120, upon receipt of this user input, to perform the tentative transaction 108 within the blockchain 110. Alternatively, the sender 102 may decide to abort the transaction due to the negative effect on risk score of the user, by clicking on the "Abort Transaction" button 519.

In some examples, the CPP device 120 may be configured to identify multiple different wallets 114 of the receiver 104 and present predicted scores 128 for each of those wallets 114 to the sender 102, thereby allowing the sender 102 to view which wallets 114 may be least impactful on their own wallet 112. For example, the risk scoring engine 122 may build trees 200A, 200B for each of those wallets 114, then separately combine the tree 200A, 200B of each wallet 114 with the trees 300A, 300B of the sender 102, likewise generating predicted score(s) for each particular wallet using the associated augmented sender transaction tree 300C. In some examples, the sender 102 maintains multiple wallets 112 on the blockchain 110. As such, the CPP device 120 presents those multiple wallets 112 to the sender 102, thereby allowing the sender 102 to choose which of their wallets 112 to use for this tentative transaction 108 (e.g., the wallet 112 that will be least impacted), or select which combination of sender wallet 112 and receiver wallet 114 to use for the transaction 108. In some examples, the CPP device 120 trains a machine learning model that is configured to identify the best combination of sender wallet 112 and receiver wallet 114 to use (e.g., which will affect the sender score the least, the best).

In the examples described herein, the external scoring service 150 and the external scores 152 represent a "black box" from the perspective of the CPP device 120. In other words, how the external scores 152 are generated (e.g., the algorithms and factors that go into generating those scores 152) are unknown to the CPP device 120. It should be understood that the term "external" is used to identify that the CPP device 120 does not have direct access to the algorithms used to generate the scores 152 that are used in the internal scoring process (thus those scores 152 are generated separate from, or using a different algorithm than, the internal scoring process described herein). As such, the CPP device 120 is not able to predict how an external score 152 of the sender wallet 112 would change based on the tentative transaction 108, as the external scoring service 150 presumably uses the state of the blockchain 110 to generate these external scores 152, and does not consider tentative transactions. Accordingly, the CPP device 120 implements its own scoring process (the "internal scoring process" described herein) to generate a "before" and "after" picture of the sender wallet 112, using the external scores 152 as raw inputs. This internal scoring process is thus distinct from the scoring process used by the external scoring service 150. In some examples, the CPP device 120 may act as the external scoring service 150 to other computing services, similarly providing the current scores 126 (e.g., as external scores 152 of a given wallet) and the predicted scores 128 (e.g., as an analytical service given some tentative transaction between one wallet and another).

Figure 6:
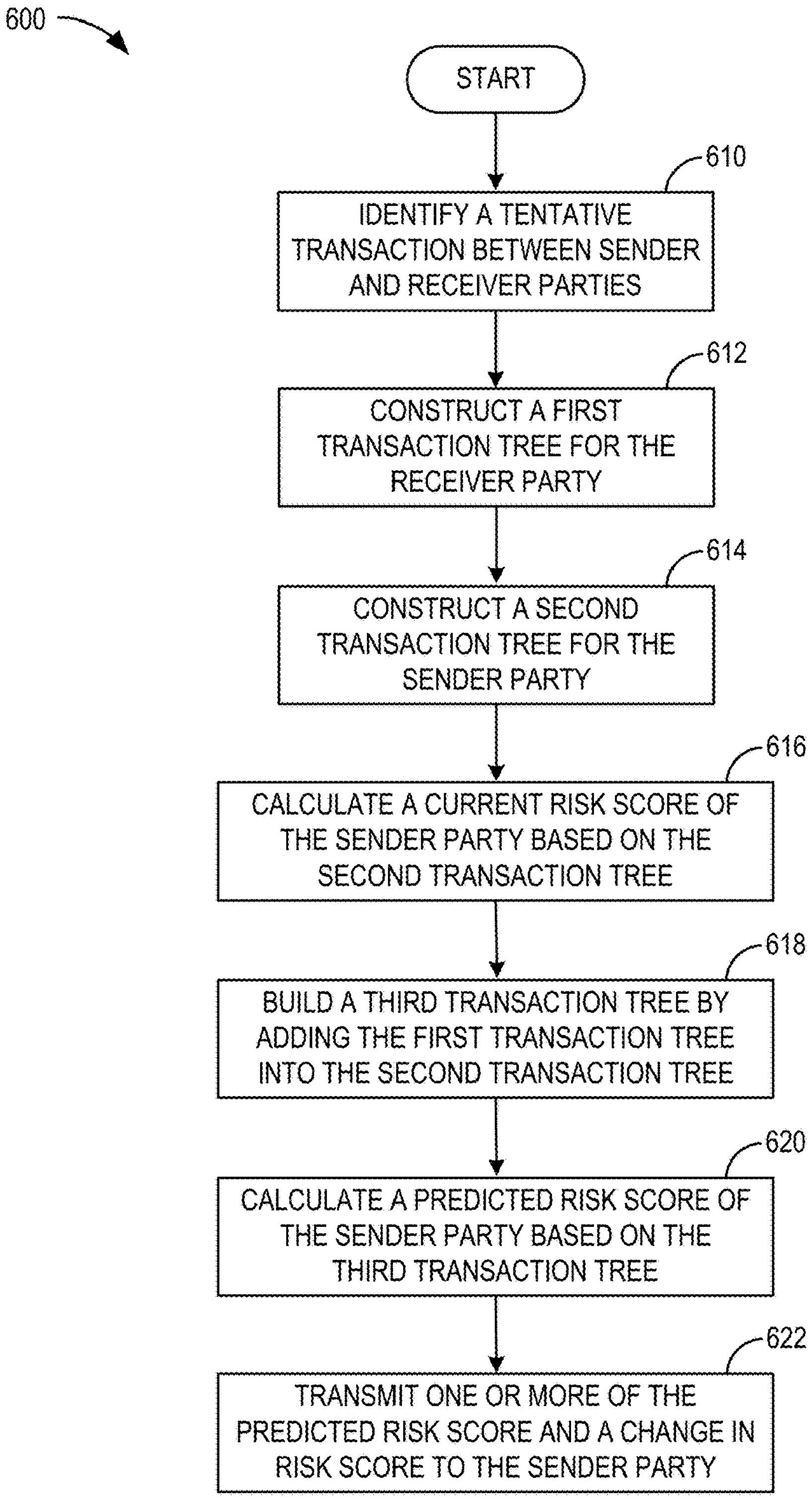
FIG. 6 is a flowchart of an exemplary method for predicting changes in risk scores in cryptocurrency transactions.

FIG. 6 is a flowchart of an exemplary method 600 for predicting changes in risk scores in cryptocurrency transactions. In some examples, the method 600 is performed by the CPP device 120 based on the tentative transaction 108 shown in FIG. 1. In the example, at operation 610, the CPP device 120 identifies a tentative transaction (e.g., tentative transaction 108) between a sender party (e.g., sender 102, sender wallet 112) and a receiver party (e.g., receiver 104, receiver wallet 114) on a cryptocurrency blockchain (e.g., blockchain 110), the tentative transaction being a cryptocurrency transaction under consideration by the sender party prior to submitting the tentative transaction to the cryptocurrency blockchain.

At operation 612, in the example, the CPP device 120 builds a first transaction tree (e.g., receiver transaction tree 200A) for the receiver party based on first cryptocurrency transactions already recorded in the cryptocurrency blockchain that directly involve the receiver party, the receiver party being represented by a first root node (e.g., root node 202) in the first transaction tree, one or more child nodes (e.g., direct wallets 212) being attached to the first root node and representing one or more other parties to the first cryptocurrency transactions with which the receiver party has transacted.

At operation 614, in the example, the CPP device 120 builds a second transaction tree (e.g., sender transaction tree 300A) for the sender party based on second cryptocurrency transactions already recorded in the cryptocurrency blockchain that directly involves the sender party, the sender party being represented by a second root node (e.g., root node 302) in the second transaction tree, one or more other child nodes (e.g., direct wallets 312) being attached to the second root node and representing one or more other parties to the second cryptocurrency transactions with which the sender party has transacted.

At operation 616, in the example, the CPP device 120 calculates a current risk score (e.g., current risk score(s) 126) of the sender party based on the second transaction tree. At operation 618, the CPP device 120 builds a third transaction tree (e.g., augmented sender transaction tree 300C), the third transaction tree including adding the first transaction tree into the second transaction tree, the first root node being directly connected as a child node to the second root node, thereby simulating the sender party as having transacted with the receiver party. At operation 620, the CPP device 120 calculates a predicted risk score (e.g., predicted score(s) 128) of the sender party based on the third transaction tree. At operation 622, the CPP device 120 transmits one or more of the predicted risk score and a change in risk score to the sender party.

In some examples, the CPP device 120 receives, from an external scoring service (e.g., external scoring service 150), an external score (e.g., external scores 152) associated with each child node included in one or more of the first, second, and third transaction trees, wherein calculating one or more of the current risk score and the predicted risk score includes calculating an average of the external scores of each child node. In some examples, the CPP device 120 also computes a child node weight for each child node in one or more of the first, second, and third transaction trees, the child node weight including one or more weighting factors associated with one or more of a transaction layer of the child node, a transaction age of an associated transaction, and a transaction value of the associated transaction, wherein calculating the average of the external scores of each child node further includes calculating a weighted average based on the external scores of each child node in combination with their associated child node weights. In some examples, the external score associated with each child node includes an overall score for an associated party on the cryptocurrency blockchain, as well as one or more specific values representing one or more of a fraud risk, a lending risk, and a reputation risk.

In some examples, the CPP device 120 removes at least one node from one or more of the first, second, and third transaction trees based on a set of predefined filters, the set of predefined filters identify conditions upon which child nodes are removed, the set of predefined filters including one or more of a transaction age of an associated transaction, a transaction depth of the child node, and a transaction value of the associated transaction.

In some examples, the CPP device 120 performs a first scan of the cryptocurrency blockchain for transactions involving the receiver party, the first scan identifying a first transaction involving the receiver party and a first direct party, the first direct party being represented by a first direct node in the first transaction tree, performs a second scan of the cryptocurrency blockchain for transactions involving the first direct party, the second scan identifying a second transaction involving the first direct party and a first secondary party, and adds a new node (e.g., secondary wallet 222) to a second layer (e.g., second layer 220) of the first transaction tree, the new node representing the first secondary party (e.g., also the secondary wallet 222), the new node being connected to the first direct node (e.g., direct wallet 212).

In some examples, the CPP device 120 receives a transaction execution message associated with the tentative transaction, and submits the tentative transaction to the cryptocurrency blockchain for execution.

Exemplary Operating Environment

Figure 7:
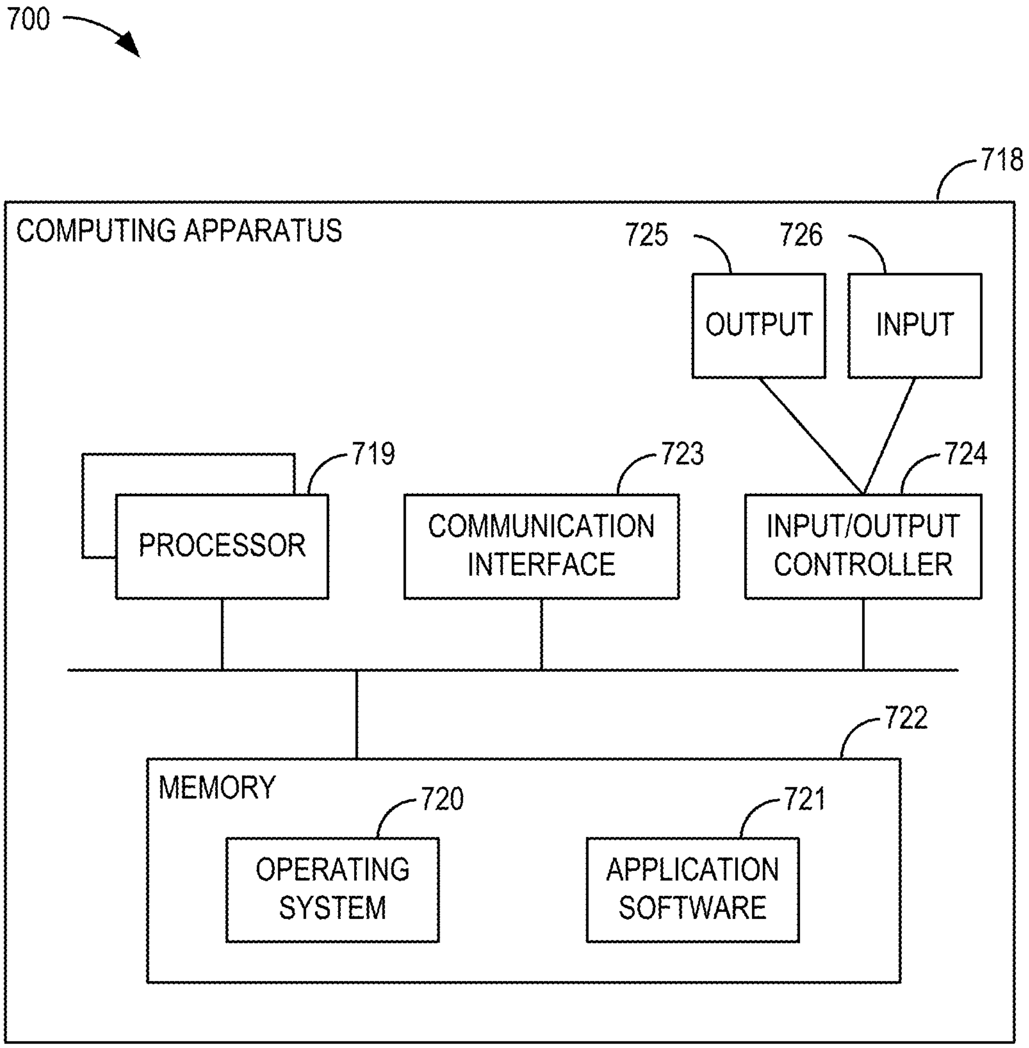
FIG. 7 is a functional block diagram of a computing apparatus according to an embodiment.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 is a computing device, such as, but not limited to, the sender computing device 106, the CPP 120, or the external scoring service 150 in FIG. 1.

The computing apparatus 718 comprises one or more processors 719 which can be microprocessors, controllers, or any other suitable type of processors for processing computer executable instructions to control the operation of the electronic device. Alternatively, or in addition, the processor 719 is any technology capable of executing logic or instructions, such as a hardcoded machine. In some examples, platform software comprising an operating system 720 or any other suitable platform software is provided on the apparatus 718 to enable application software 721 to be executed on the device. In some examples, aspects of the disclosure may be implemented in software, hardware, and/or firmware.

In some examples, computer executable instructions are provided using any computer-readable medium or media accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 in other examples outputs data to devices other than the output device, e.g., a locally connected printing device. In some examples, a user provides input to the input device(s) 726 and/or receives output from the output device(s) 725.

The functionality described herein can be performed, at least in part, by one or more hardware logic components. The computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

ADDITIONAL EXAMPLES

In some examples, a cryptocurrency preprocessing system is provided. The cryptocurrency preprocessing system includes at least one processor; and at least one memory comprising computer-readable instructions, the at least one processor, the at least one memory and the computer-readable instructions configured to cause the at least one processor to: identify a tentative transaction between a first party (e.g., a receiver party) and a second party (e.g., a sender party) on a cryptocurrency blockchain, the tentative transaction being a cryptocurrency transaction under consideration by the second party prior to submitting the tentative transaction to the cryptocurrency blockchain; construct a first transaction tree for the first party based on first cryptocurrency transactions already recorded in the cryptocurrency blockchain that directly involve the first party, the first party being represented by a first root node in the first transaction tree, one or more child nodes being attached to the first root node and representing one or more other parties to the first cryptocurrency transactions with which the first party has transacted; construct a second transaction tree for the second party based on second cryptocurrency transactions already recorded in the cryptocurrency blockchain that directly involves the second party, the second party being represented by a second root node in the second transaction tree, one or more other child nodes being attached to the second root node and representing one or more other parties to the second cryptocurrency transactions with which the second party has transacted; calculate a current risk score of the second party based on the second transaction tree; modify the second transaction tree by adding the first transaction tree to the second transaction tree, the first root node being directly connected as a child node to the second root node, thereby simulating the first party as having transacted with the second party; calculate a predicted risk score of the second party based on the modified second transaction tree; and cause one or more of the predicted risk score and a change in risk score to be displayed to the second party.

In some examples, a computer-implemented method for predicting changes in risk scores in cryptocurrency transactions is provided. The method includes: identifying a tentative transaction between a sender party and a receiver party on a cryptocurrency blockchain, the tentative transaction being a cryptocurrency transaction under consideration by the sender party prior to submitting the tentative transaction to the cryptocurrency blockchain; building a first transaction tree for the receiver party based on first cryptocurrency transactions already recorded in the cryptocurrency blockchain that directly involve the receiver party, the receiver party being represented by a first root node in the first transaction tree, one or more child nodes being attached to the first root node and representing one or more other parties to the first cryptocurrency transactions with which the receiver party has transacted; building a second transaction tree for the sender party based on second cryptocurrency transactions already recorded in the cryptocurrency blockchain that directly involves the sender party, the sender party being represented by a second root node in the second transaction tree, one or more other child nodes being attached to the second root node and representing one or more other parties to the second cryptocurrency transactions with which the sender party has transacted; calculating a current risk score of the sender party based on the second transaction tree; building a third transaction tree, the third transaction tree including adding the first transaction tree into the second transaction tree, the first root node being directly connected as a child node to the second root node, thereby simulating the sender party as having transacted with the receiver party; calculating a predicted risk score of the sender party based on the third transaction tree; and transmitting one or more of the predicted risk score and a change in risk score to the sender party.

In some examples, a computer storage medium is provided. The computer storage medium having computer-executable instructions that, upon execution by a processor of a computer, cause the processor to at least: identify a tentative transaction between a first party and a second party on a cryptocurrency blockchain, the tentative transaction being a cryptocurrency transaction under consideration by the second party prior to submitting the tentative transaction to the cryptocurrency blockchain; construct a first transaction tree for the first party based on first cryptocurrency transactions already recorded in the cryptocurrency blockchain that directly involve the first party, the first party being represented by a first root node in the first transaction tree, one or more child nodes being attached to the first root node and representing one or more other parties to the first cryptocurrency transactions with which the first party has transacted; construct a second transaction tree for the second party based on second cryptocurrency transactions already recorded in the cryptocurrency blockchain that directly involves the second party, the second party being represented by a second root node in the second transaction tree, one or more other child nodes being attached to the second root node and representing one or more other parties to the second cryptocurrency transactions with which the second party has transacted; calculate a current risk score of the second party based on the second transaction tree; modify the second transaction tree by adding the first transaction tree to the second transaction tree, the first root node being directly connected as a child node to the second root node, thereby simulating the first party as having transacted with the second party; calculate a predicted risk score of the second party based on the modified second transaction tree; and cause one or more of the predicted risk score and a change in risk score to be displayed to the second party.

Alternatively, or in addition to the other examples described herein, examples include any combination of the following:

identifying a tentative transaction between a first party and a second party on a cryptocurrency blockchain;

the tentative transaction being a cryptocurrency transaction under consideration by the second party prior to submitting the tentative transaction to the cryptocurrency blockchain;

the tentative transaction identifying an address on a cryptocurrency blockchain for the first party and another address for the second party;

the tentative transaction identifying a transaction value to be exchanged;

constructing a first transaction tree for the first party based on first cryptocurrency transactions already recorded in the cryptocurrency blockchain that directly involve the first party;

the first party being represented by a first root node in the first transaction tree;

one or more child nodes being attached to the first root node and representing one or more other parties to the first cryptocurrency transactions with which the first party has transacted;

construct a second transaction tree for the second party based on second cryptocurrency transactions already recorded in the cryptocurrency blockchain that directly involves the second party;

the second party being represented by a second root node in the second transaction tree;

one or more other child nodes being attached to the second root node and representing one or more other parties to the second cryptocurrency transactions with which the second party has transacted;

calculate a current risk score of the second party based on the second transaction tree;

modifying the second transaction tree by adding the first transaction tree to the second transaction tree;

the first root node being directly connected as a child node to the second root node, thereby simulating the first party as having transacted with the second party;

calculating a predicted risk score of the second party based on the modified second transaction tree;

causing one or more of the predicted risk score and a change in risk score to be displayed to the second party;

receiving, from an external scoring service, an external score associated with each child node included in one or more of the first and second transaction trees;

wherein calculating one or more of the current risk score and the predicted risk score includes calculating an average of the external scores of each child node;

computing a child node weight for each child node in the second transaction tree;

the child node weight including one or more weighting factors associated with one or more of a transaction layer of the child node, a transaction age of an associated transaction, and a transaction value of the associated transaction;

calculating the average of the external scores of each child node further includes calculating a weighted average based on the external scores of each child node in combination with their associated child node weights;

the external score associated with each child node includes an overall score for an associated party on the cryptocurrency blockchain, as well as one or more specific values representing one or more of a fraud risk, a lending risk, and a reputation risk;

filtering a transaction tree based on a set of predefined filters;

the set of predefined filters identify conditions upon which child nodes are removed;

the set of predefined filters including one or more of a transaction age of an associated transaction, a transaction depth of the child node, and a transaction value of the associated transaction;

wherein constructing the first transaction tree for the first party further includes performing a first scan of the cryptocurrency blockchain for transactions involving the first party;

the first scan identifying a first transaction involving the first party and a first direct party;

the first direct party being represented by a first direct node in the first transaction tree;

performing a second scan of the cryptocurrency blockchain for transactions involving the first direct party;

the second scan identifying a second transaction involving the first direct party and a first secondary party;

adding a new node to a second layer of the first transaction tree, the new node representing the first secondary party, the new node being connected to the first direct node;

after causing one or more of the predicted risk score and a change in risk score to be displayed to the second party, receiving a transaction execution message associated with the tentative transaction;

submitting the tentative transaction to the cryptocurrency blockchain for execution;

identifying a tentative transaction between a sender party and a receiver party on a cryptocurrency blockchain;

the tentative transaction being a cryptocurrency transaction under consideration by the sender party prior to submitting the tentative transaction to the cryptocurrency blockchain;

building a first transaction tree for the receiver party based on first cryptocurrency transactions already recorded in the cryptocurrency blockchain that directly involve the receiver party;

the receiver party being represented by a first root node in the first transaction tree;

one or more child nodes being attached to the first root node and representing one or more other parties to the first cryptocurrency transactions with which the receiver party has transacted;

building a second transaction tree for the sender party based on second cryptocurrency transactions already recorded in the cryptocurrency blockchain that directly involves the sender party;

the sender party being represented by a second root node in the second transaction tree;

one or more other child nodes being attached to the second root node and representing one or more other parties to the second cryptocurrency transactions with which the sender party has transacted;

calculating a current risk score of the sender party based on the second transaction tree;

building a third transaction tree, the third transaction tree including adding the first transaction tree into the second transaction tree;

the first root node being directly connected as a child node to the second root node, thereby simulating the sender party as having transacted with the receiver party;

calculating a predicted risk score of the sender party based on the third transaction tree;

transmitting one or more of the predicted risk score and a change in risk score to the sender party.

receiving, from an external scoring service, an external score associated with each child node included in one or more of the first, second, and third transaction trees;

calculating an average of the external scores of each child node;

computing a child node weight for each child node in a transaction tree;

the child node weight including one or more weighting factors associated with one or more of a transaction layer of the child node, a transaction age of an associated transaction, and a transaction value of the associated transaction;

calculating a weighted average based on the external scores of each child node in combination with their associated child node weights;

the external score associated with each child node includes an overall score for an associated party on the cryptocurrency blockchain, as well as one or more specific values representing one or more of a fraud risk, a lending risk, and a reputation risk;

removing at least one node from a transaction tree based on a set of predefined filters;

the set of predefined filters identify conditions upon which child nodes are removed;

the set of predefined filters including one or more of a transaction age of an associated transaction, a transaction depth of the child node, and a transaction value of the associated transaction;

performing a first scan of the cryptocurrency blockchain for transactions involving the receiver party;

the first scan identifying a first transaction involving the receiver party and a first direct party;

the first direct party being represented by a first direct node in the first transaction tree;

performing a second scan of the cryptocurrency blockchain for transactions involving the first direct party;

the second scan identifying a second transaction involving the first direct party and a first secondary party;

adding a new node to a second layer of the first transaction tree, the new node representing the first secondary party, the new node being connected to the first direct node;

receiving a transaction execution message associated with the tentative transaction;

submitting the tentative transaction to the cryptocurrency blockchain for execution;

storing a tentative transaction between a sender party and a receiver party on a cryptocurrency blockchain, the tentative transaction being a cryptocurrency transaction under consideration by the sender party prior to submitting the tentative transaction to the cryptocurrency blockchain;

building a first transaction tree for the receiver party based on first cryptocurrency transactions already recorded in the cryptocurrency blockchain that directly involve the receiver party, the receiver party being represented by a first root node in the first transaction tree, one or more child nodes being attached to the first root node and representing one or more other parties to the first cryptocurrency transactions with which the receiver party has transacted;

building a second transaction tree for the sender party based on second cryptocurrency transactions already recorded in the cryptocurrency blockchain that directly involves the sender party, the sender party being represented by a second root node in the second transaction tree, one or more other child nodes being attached to the second root node and representing one or more other parties to the second cryptocurrency transactions with which the sender party has transacted;

calculating a current risk score of the sender party based on the second transaction tree;

converting the second transaction tree into a third transaction tree by adding the first transaction tree to the second transaction tree, the first root node being directly connected as a child node to the second root node, thereby simulating the receiver party as having transacted with the sender party;

storing the third transaction tree in a memory;

calculating a predicted risk score of the sender party based on the third transaction tree;

automatically generating a message containing one or more of the predicted risk score and a change in risk score; and transmitting the message to the sender party, so that the sender party has immediate access to the one or more of the predicted risk score and a change in risk score.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying a tentative transaction between a sender party and a receiver party on a cryptocurrency blockchain, the tentative transaction being a cryptocurrency transaction under consideration by the sender party prior to submitting the tentative transaction to the cryptocurrency blockchain; exemplary means for building a first transaction tree for the receiver party based on first cryptocurrency transactions already recorded in the cryptocurrency blockchain that directly involve the receiver party, the receiver party being represented by a first root node in the first transaction tree, one or more child nodes being attached to the first root node and representing one or more other parties to the first cryptocurrency transactions with which the receiver party has transacted; exemplary means for building a second transaction tree for the sender party based on second cryptocurrency transactions already recorded in the cryptocurrency blockchain that directly involves the sender party, the sender party being represented by a second root node in the second transaction tree, one or more other child nodes being attached to the second root node and representing one or more other parties to the second cryptocurrency transactions with which the sender party has transacted; exemplary means for calculating a current risk score of the sender party based on the second transaction tree; exemplary means for building a third transaction tree, the third transaction tree including adding the first transaction tree into the second transaction tree, the first root node being directly connected as a child node to the second root node, thereby simulating the sender party as having transacted with the receiver party; exemplary means for calculating a predicted risk score of the sender party based on the third transaction tree; and exemplary means for transmitting one or more of the predicted risk score and a change in risk score to the sender party.

At least a portion of the functionality of the various elements in FIG. 1 to FIG. 7 can be performed by other elements in FIG. 1 to FIG. 7, or an entity (e.g., processor, web service, server, application program, computing device, etc.) not shown in FIG. 1 to FIG. 7.

In some examples, the operations illustrated in FIG. 5A to FIG. 6 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A cryptocurrency preprocessing system for reducing processing load and network traffic, the system comprising:

at least one processor; and at least one memory comprising computer-readable instructions, the at least one processor, the at least one memory and the computer-readable instructions configured to cause the at least one processor to:

identify a tentative transaction between a first party and a second party on a cryptocurrency blockchain, the tentative transaction being a cryptocurrency transaction under consideration by the second party prior to submitting the tentative transaction to the cryptocurrency blockchain, wherein the tentative transaction identifies an address on the cryptocurrency blockchain for the second party and another address for the first party;

traverse a distributed ledger of the cryptocurrency blockchain to identify recorded transactions involving the first party, and construct a first transaction tree for the first party based on first cryptocurrency transactions already recorded in the cryptocurrency blockchain that directly involve the first party, the first party being represented by a first root node in the first transaction tree, one or more child nodes being attached to the first root node and representing one or more other parties to the first cryptocurrency transactions with which the first party has transacted;

traverse the distributed ledger of the cryptocurrency blockchain to identify recorded transactions involving the second party, and construct a second transaction tree for the second party based on second cryptocurrency transactions already recorded in the cryptocurrency blockchain that directly involve the second party, the second party being represented by a second root node in the second transaction tree, one or more other child nodes being attached to the second root node and representing one or more other parties to the second cryptocurrency transactions with which the second party has transacted;

calculate a current risk score of a user based on the second transaction tree prior to the tentative transaction being committed as a persistent record to the distributed ledger;

modify the second transaction tree by adding the first transaction tree to the second transaction tree, the first root node being directly connected as a child node to the second root node, causing a simulation of the first party as having transacted with the second party;

calculate a predicted risk score of the second party based on the modified second transaction tree; and transmit, via a network, the predicted risk score to a sender computing device; and cause the predicted risk score and a change in risk score to be displayed to the second party, causing the second party to perform an evaluation of potential impact on the second party of performing the tentative transaction, the evaluation occurring before the tentative transaction is submitted for immutable recording on the cryptocurrency blockchain, and the second party not performing the tentative transaction upon the evaluation concluding that performing the tentative transaction would cause a negative impact to the second party, thereby reducing the processing load on the at least one processor and traffic on the network.

2. The cryptocurrency preprocessing system of claim 1, wherein the computer-readable instructions are further configured to cause the at least one processor to:

after causing the predicted risk score and a change in risk score to be displayed to the second party, receive a transaction execution message associated with the tentative transaction; and submit the tentative transaction to the cryptocurrency blockchain for execution.

3. The cryptocurrency preprocessing system of claim 1, wherein the computer-readable instructions are further configured to cause the at least one processor to:

receive, from an external scoring service, an external score associated with each child node included in one or more of the first and second transaction trees, wherein calculating the current risk score and the predicted risk score includes calculating an average of the external scores of each child node.

4. The cryptocurrency preprocessing system of claim 3, wherein the computer-readable instructions are further configured to cause the at least one processor to:

compute a child node weight for each child node in the second transaction tree, the child node weight including one or more weighting factors associated with one or more of a transaction layer of the child node, a transaction age of an associated transaction, and a transaction value of the associated transaction, wherein calculating the average of the external scores of each child node further includes calculating a weighted average based on the external scores of each child node in combination with their associated child node weights.

5. The cryptocurrency preprocessing system of claim 3, wherein the external score associated with each child node includes an overall score for an associated party on the cryptocurrency blockchain, as well as one or more specific values representing one or more of a fraud risk, a lending risk, and a reputation risk.

6. The cryptocurrency preprocessing system of claim 1, wherein the computer-readable instructions are further configured to cause the at least one processor to:

filter one or more of the first transaction tree, the second transaction tree, and the modified second transaction tree based on a set of predefined filters, the set of predefined filters identify conditions upon which child nodes are removed, the set of predefined filters including one or more of a transaction age of an associated transaction, a transaction depth of the child node, and a transaction value of the associated transaction.

7. The cryptocurrency preprocessing system of claim 1, wherein constructing the first transaction tree for the first party further includes:

performing a first scan of the cryptocurrency blockchain for transactions involving the first party, the first scan identifying a first transaction involving the first party and a first direct party, the first direct party being represented by a first direct node in the first transaction tree;

performing a second scan of the cryptocurrency blockchain for transactions involving the first direct party, the second scan identifying a second transaction involving the first direct party and a first secondary party; and adding a new node to a second layer of the first transaction tree, the new node representing the first secondary party, the new node being connected to the first direct node.

8. A computer-implemented method for reducing processor load and network traffic, the method comprising:

identifying a tentative transaction between a sender party and a receiver party on a cryptocurrency blockchain, the tentative transaction being a cryptocurrency transaction under consideration by the sender party prior to submitting the tentative transaction to the cryptocurrency blockchain, wherein the tentative transaction identifies an address on the cryptocurrency blockchain for the sender party and another address for the receiver party;

traversing a distributed ledger of the cryptocurrency blockchain to identify recorded transactions involving the receiver party, and building a first transaction tree for the receiver party based on first cryptocurrency transactions already recorded in the cryptocurrency blockchain that directly involve the receiver party, the receiver party being represented by a first root node in the first transaction tree, one or more child nodes being attached to the first root node and representing one or more other parties to the first cryptocurrency transactions with which the receiver party has transacted;

traversing the distributed ledger of the cryptocurrency blockchain to identify recorded transactions involving the sender party, and building a second transaction tree for the sender party based on second cryptocurrency transactions already recorded in the cryptocurrency blockchain that directly involves the sender party, the sender party being represented by a second root node in the second transaction tree, one or more other child nodes being attached to the second root node and representing one or more other parties to the second cryptocurrency transactions with which the sender party has transacted;

calculating a current risk score of the sender party based on the second transaction tree;

building a third transaction tree, the third transaction tree including adding the first transaction tree into the second transaction tree, the first root node being directly connected as a child node to the second root node, causing a simulation of the sender party as having transacted with the receiver party prior to the tentative transaction being committed as a persistent record to the distributed ledger;

calculating a predicted risk score of the sender party based on the third transaction tree; and transmitting, via a network, the predicted risk score and a change in risk score to the sender party, causing the sender party to perform an evaluation of potential impact on the sender party of performing the tentative transaction, the evaluation occurring before the tentative transaction is submitted for immutable recording on the cryptocurrency blockchain, and the sender party not performing the tentative transaction upon the evaluation concluding that performing the tentative transaction would cause a negative impact to the sender party, thereby reducing the processing load on the processor and traffic on the network.

9. The computer-implemented method of claim 8, further comprising:

receiving, from an external scoring service, an external score associated with each child node included in one or more of the first, second, and third transaction trees, wherein calculating one or more of the current risk score and the predicted risk score includes calculating an average of the external scores of each child node.

10. The computer-implemented method of claim 9, further comprising:

computing a child node weight for each child node in one or more of the first, second, and third transaction trees, the child node weight including one or more weighting factors associated with one or more of a transaction layer of the child node, a transaction age of an associated transaction, and a transaction value of the associated transaction, wherein calculating the average of the external scores of each child node further includes calculating a weighted average based on the external scores of each child node in combination with their associated child node weights.

11. The computer-implemented method of claim 9, wherein the external score associated with each child node includes an overall score for an associated party on the cryptocurrency blockchain, as well as one or more specific values representing one or more of a fraud risk, a lending risk, and a reputation risk.

12. The computer-implemented method of claim 8, further comprising:

removing at least one node from one or more of the first, second, and third transaction trees based on a set of predefined filters, the set of predefined filters identify conditions upon which child nodes are removed, the set of predefined filters including one or more of a transaction age of an associated transaction, a transaction depth of the child node, and a transaction value of the associated transaction.

13. The computer-implemented method of claim 8, wherein constructing one or more of the first, second, and third transaction trees further includes:

performing a first scan of the cryptocurrency blockchain for transactions involving the receiver party, the first scan identifying a first transaction involving the receiver party and a first direct party, the first direct party being represented by a first direct node in the first transaction tree;

performing a second scan of the cryptocurrency blockchain for transactions involving the first direct party, the second scan identifying a second transaction involving the first direct party and a first secondary party; and adding a new node to a second layer of the first transaction tree, the new node representing the first secondary party, the new node being connected to the first direct node.

14. The computer-implemented method of claim 8, further comprising:

receiving a transaction execution message associated with the tentative transaction; and submitting the tentative transaction to the cryptocurrency blockchain for execution.

15. A computer storage medium having computer-executable instructions that, upon execution by a processor of a computer, cause the processor to perform actions for performing to reduce processing load and network traffic by least:

identify a tentative transaction between a first party and a second party on a cryptocurrency blockchain, the tentative transaction being a cryptocurrency transaction under consideration by the second party prior to submitting the tentative transaction to the cryptocurrency blockchain, wherein the tentative transaction identifies an address on the cryptocurrency blockchain for the second party and another address for the first party;

traverse a distributed ledger of the cryptocurrency blockchain to identify recorded transactions involving the first party, and construct a first transaction tree for the first party based on first cryptocurrency transactions already recorded in the cryptocurrency blockchain that directly involve the first party, the first party being represented by a first root node in the first transaction tree, one or more child nodes being attached to the first root node and representing one or more other parties to the first cryptocurrency transactions with which the first party has transacted;

traverse the distributed ledger of the cryptocurrency blockchain to identify recorded transactions involving the second party, and construct a second transaction tree for the second party based on second cryptocurrency transactions already recorded in the cryptocurrency blockchain that directly involves the second party, the second party being represented by a second root node in the second transaction tree, one or more other child nodes being attached to the second root node and representing one or more other parties to the second cryptocurrency transactions with which the second party has transacted;

calculate a current risk score of the second party based on the second transaction tree;

modify the second transaction tree by adding the first transaction tree to the second transaction tree, the first root node being directly connected as a child node to the second root node, causing a simulation of the first party as having transacted with the second party prior to the tentative transaction being committed as a persistent record to the distributed ledger;

calculate a predicted risk score of the second party based on the modified second transaction tree;

transmit, via a network, the predicted risk score to a sender computing device; and cause the predicted risk score and a change in risk score to be displayed to the second party, causing the second party to perform an evaluation of potential impact on the second party of performing the tentative transaction, the evaluation occurring before the tentative transaction is submitted for immutable recording on the cryptocurrency blockchain, and the second party not performing the tentative transaction upon the evaluation concluding that performing the tentative transaction would cause a negative impact to the second party, thereby reducing the processing load on the processor and traffic on the network.

16. The computer storage medium of claim 15, wherein the computer-executable instructions further cause the processor to:

receive, from an external scoring service, an external score associated with each child node included in one or more of the first and second transaction trees, wherein calculating one or more of the current risk score and the predicted risk score includes calculating an average of the external scores of each child node.

17. The computer storage medium of claim 16, wherein the computer-executable instructions further cause the processor to:

compute a child node weight for each child node in the second transaction tree, the child node weight including one or more weighting factors associated with one or more of a transaction layer of the child node, a transaction age of an associated transaction, and a transaction value of the associated transaction, wherein calculating the average of the external scores of each child node further includes calculating a weighted average based on the external scores of each child node in combination with their associated child node weights.

18. The computer storage medium of claim 16, wherein the external score associated with each child node includes an overall score for an associated party on the cryptocurrency blockchain, as well as one or more specific values representing one or more of a fraud risk, a lending risk, and a reputation risk.

19. The computer storage medium of claim 15, wherein the computer-executable instructions further cause the processor to:

filter one or more of the first transaction tree, the second transaction tree, and the modified second transaction tree based on a set of predefined filters, the set of predefined filters identify conditions upon which child nodes are removed, the set of predefined filters including one or more of a transaction age of an associated transaction, a transaction depth of the child node, and a transaction value of the associated transaction.

20. The computer storage medium of claim 16, wherein constructing the first transaction tree for the first party further includes:

performing a first scan of the cryptocurrency blockchain for transactions involving the first party, the first scan identifying a first transaction involving the first party and a first direct party, the first direct party being represented by a first direct node in the first transaction tree;

performing a second scan of the cryptocurrency blockchain for transactions involving the first direct party, the second scan identifying a second transaction involving the first direct party and a first secondary party; and adding a new node to a second layer of the first transaction tree, the new node representing the first secondary party, the new node being connected to the first direct node.

* * * * *